(12) United States Patent
So et al.

(10) Patent No.: US 12,041,437 B2
(45) Date of Patent: *Jul. 16, 2024

(54) DISPLAY DEVICE AND CONTROL METHOD THEREOF

(71) Applicant: SAMSUNG ELECTRONICS CO., LTD., Suwon-si (KR)

(72) Inventors: Yongjin So, Suwon-si (KR); Seokho Ban, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 7 days.

This patent is subject to a terminal disclaimer.

(21) Appl. No.: 17/677,279

(22) Filed: Feb. 22, 2022

(65) Prior Publication Data

US 2022/0174445 A1    Jun. 2, 2022

Related U.S. Application Data

(63) Continuation of application No. 16/875,176, filed on May 15, 2020, now Pat. No. 11,290,832.

(30) Foreign Application Priority Data

Apr. 10, 2020 (KR) .................. 10-2020-0044146
Apr. 29, 2020 (KR) .................. 10-2020-0052786

(51) Int. Cl.
*H04S 7/00* (2006.01)
*F16M 11/10* (2006.01)
(Continued)

(52) U.S. Cl.
CPC .............. *H04S 7/30* (2013.01); *H04N 5/642* (2013.01); *H04R 1/028* (2013.01); *H04R 5/02* (2013.01);
(Continued)

(58) Field of Classification Search
None
See application file for complete search history.

(56) References Cited

U.S. PATENT DOCUMENTS 7,688,306 B2    3/2010  Wehrenberg et al.
8,139,171 B2    3/2012  Osada et al.
(Continued)

FOREIGN PATENT DOCUMENTS

CN       1848032 A    10/2006
CN     102176765 A     9/2011
(Continued)

OTHER PUBLICATIONS

Communication dated Jan. 18, 2023, issued by European Patent Office in European Application No. 20175006.4.
(Continued)

*Primary Examiner* — Qin Zhu
(74) *Attorney, Agent, or Firm* — Sughrue Mion, PLLC

(57) ABSTRACT

A display device comprises: a motor; a display; a plurality of speakers provided in a plurality of regions of the display; and at least one processor. The at least one processor being configured to output a plurality of audio signals corresponding to a plurality of audio channels to the plurality of speakers, control the motor to rotate the display, based on an input of a user command for rotating the display, and control the plurality of speakers to output the plurality of audio signals in response to a change in positions of the plurality of speakers based on a rotation of the display.

16 Claims, 21 Drawing Sheets

(51) Int. Cl.
  *F16M 11/18* (2006.01)
  *G06F 3/147* (2006.01)
  *G06F 3/16* (2006.01)
  *H04N 5/64* (2006.01)
  *H04N 5/655* (2006.01)
  *H04R 1/02* (2006.01)
  *H04R 5/02* (2006.01)
  *H04R 5/04* (2006.01)
  *H04S 3/00* (2006.01)

(52) U.S. Cl.
  CPC ............... *H04R 5/04* (2013.01); *H04S 3/008* (2013.01); *H04R 2499/15* (2013.01); *H04S 2400/01* (2013.01)

(56) References Cited

U.S. PATENT DOCUMENTS

| | | |
|---|---|---|
| 9,241,217 B2 | 1/2016 | Rodgers |
| 10,567,877 B2 | 2/2020 | Nam et al. |
| 2002/0181722 A1 | 12/2002 | Hibino et al. |
| 2005/0047624 A1 | 3/2005 | Kleen |
| 2006/0161278 A1 | 7/2006 | Maeda et al. |
| 2006/0227985 A1 | 10/2006 | Kawanami |
| 2008/0285779 A1 | 11/2008 | Naito |
| 2010/0195200 A1 | 8/2010 | Kondo et al. |
| 2011/0002487 A1 | 1/2011 | Panther et al. |
| 2011/0052139 A1 | 3/2011 | Oku |
| 2011/0136546 A1 | 6/2011 | Otsuki |
| 2011/0150247 A1 | 6/2011 | Oliveras |
| 2011/0316768 A1 | 12/2011 | McRae |
| 2013/0129122 A1* | 5/2013 | Johnson ............... H04S 1/00 381/306 |
| 2013/0163794 A1 | 6/2013 | Groves et al. |
| 2014/0003619 A1* | 1/2014 | Sannie ............... H04S 7/308 381/81 |
| 2014/0233772 A1 | 8/2014 | Giustina |
| 2014/0333671 A1 | 11/2014 | Phang et al. |
| 2015/0181337 A1 | 6/2015 | Rodgers |
| 2016/0021454 A1 | 1/2016 | Liang et al. |
| 2016/0029100 A1* | 1/2016 | White ............... H04N 21/4858 725/37 |
| 2018/0338214 A1 | 11/2018 | Leuschner et al. |
| 2020/0053465 A1 | 2/2020 | Wang et al. |

FOREIGN PATENT DOCUMENTS

| | | |
|---|---|---|
| CN | 109348399 A | 2/2019 |
| KR | 10-1160359 B1 | 6/2012 |
| KR | 10-2014-0146488 A | 12/2014 |
| KR | 10-2015-0087530 A | 7/2015 |
| KR | 10-2016-0071970 A | 6/2016 |
| KR | 10-2019-0095789 A | 8/2019 |

OTHER PUBLICATIONS

International Search Report (PCT/ISA/210) dated Jan. 8, 2021 issued by the International Searching Authority in International Application No. PCT/KR2020/006458.
Written Opinion (PCT/ISA/237) dated Jan. 7, 2021 issued by the International Searching Authority in International Application No. PCT/KR2020/006458.
Office Action issued Jan. 13, 2021 by the National Intellectual Property Administration, PRC in corresponding Chinese Application No. 202010400069.9.
Communication dated May 12, 2021, from the European Patent Office in European Application No. 20175006.4.
Communication dated Aug. 17, 2020, issued by the European Patent Office in counterpart European Application No. 20175006.4.
Communication issued Sep. 8, 2020, issued by the Korean Patent Office in counterpart Korean Patent Application No. 10-2020-0052786.
Notice of Allowance issued in parent U.S. Appl. No. 16/875,176 mailed Nov. 22, 2021.
Final Office Action issued in parent U.S. Appl. No. 16/875,176 mailed Aug. 2, 2021.
Non-Final Office Action issued in parent U.S. Appl. No. 16/875,176 mailed Mar. 30, 2021.
Communication dated Sep. 25, 2023 issued by the European Patent Office in European Patent Application No. 20175006.4.
Communication dated Dec. 22, 2023, issued by the European Patent Office in European Patent Application No. 20175006.4.

* cited by examiner

FIG. 6B

|  | (1) | (2) | (3) | (4) |
|---|---|---|---|---|
| FIRST SPEAKER (130-1) | Channel Center | Channel Center | Channel Right | Channel Right |
| SECOND SPEAKER (130-2) | Channel Right | Channel Right | Channel Bottom | Channel Bottom |
| THIRD SPEAKER (130-3) | Channel Bottom | Channel Bottom | Channel Left | Channel Left |
| FOURTH SPEAKER (130-4) | Channel Left | Channel Left | Channel Center | Channel Center |

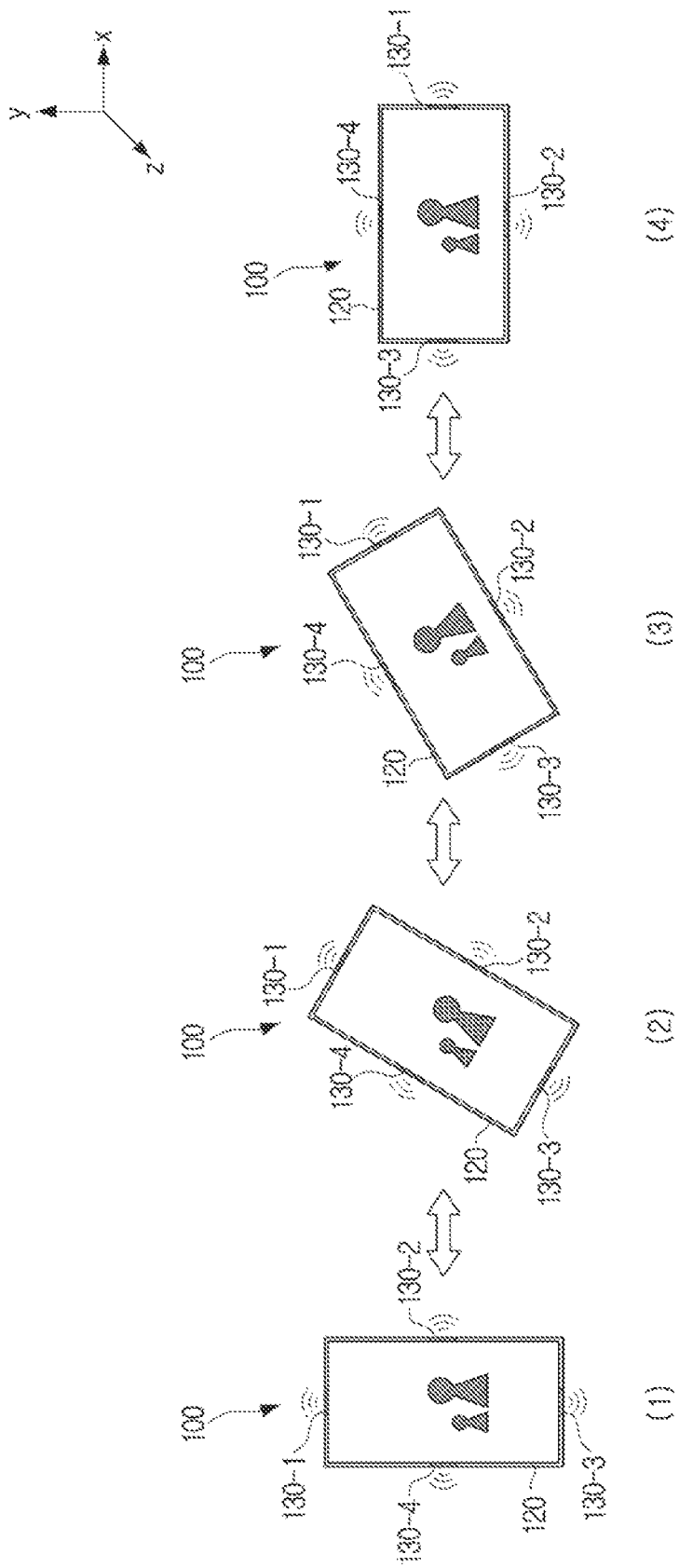

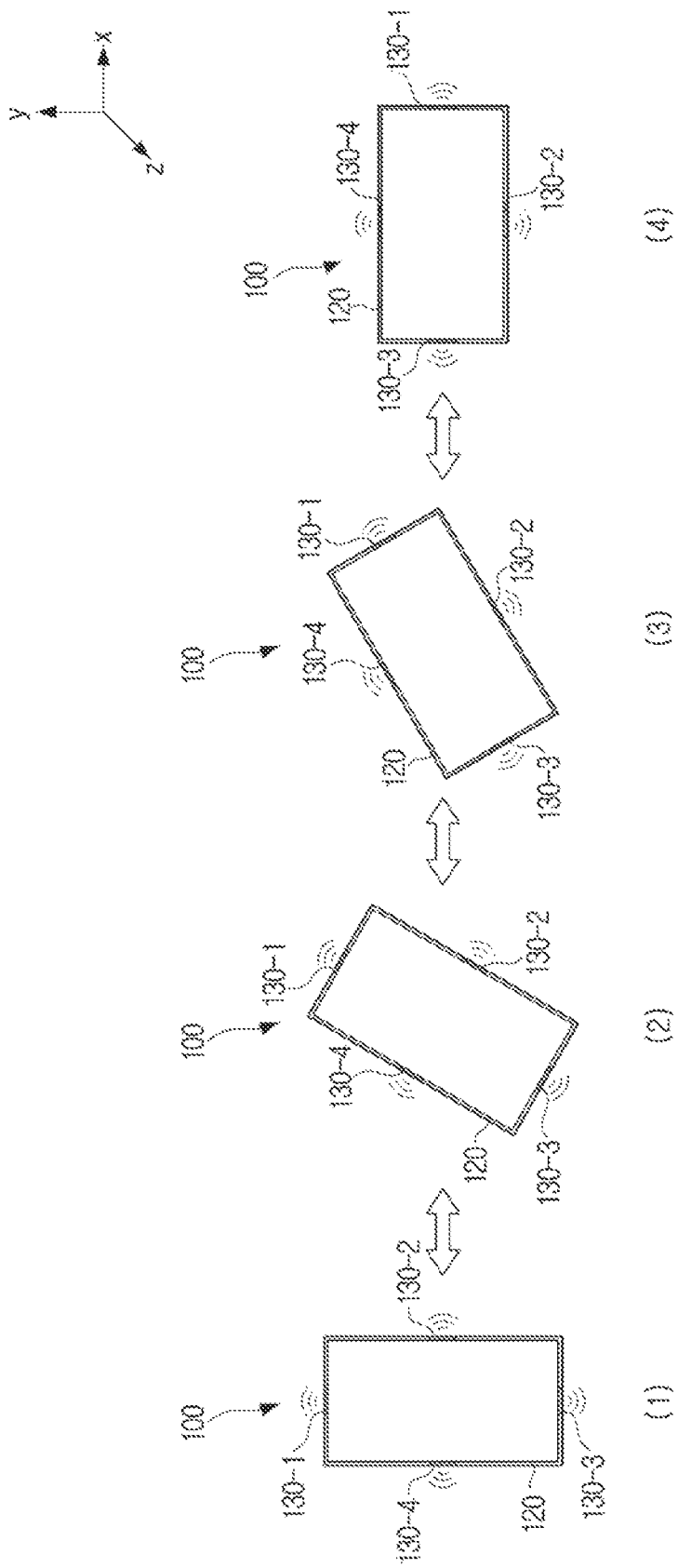

FIG. 7B

|  | (1) | (2) | (3) | (4) |
|---|---|---|---|---|
| 130-1 — FIRST SPEAKER | Channel Center 100% | Channel Center 67% / Channel Right 33% | Channel Center 50% / Channel Right 50% | Channel Right 100% |
| 130-2 — SECOND SPEAKER | Channel Right 100% | Channel Right 67% / Channel Bottom 33% | Channel Right 50% / Channel Bottom 50% | Channel Bottom 100% |
| 130-3 — THIRD SPEAKER | Channel Bottom 100% | Channel Bottom 67% / Channel Left 33% | Channel Bottom 50% / Channel Left 50% | Channel Left 100% |
| 130-4 — FOURTH SPEAKER | Channel Left 100% | Channel Left 67% / Channel Center 33% | Channel Left 50% / Channel Center 50% | Channel Center 100% |

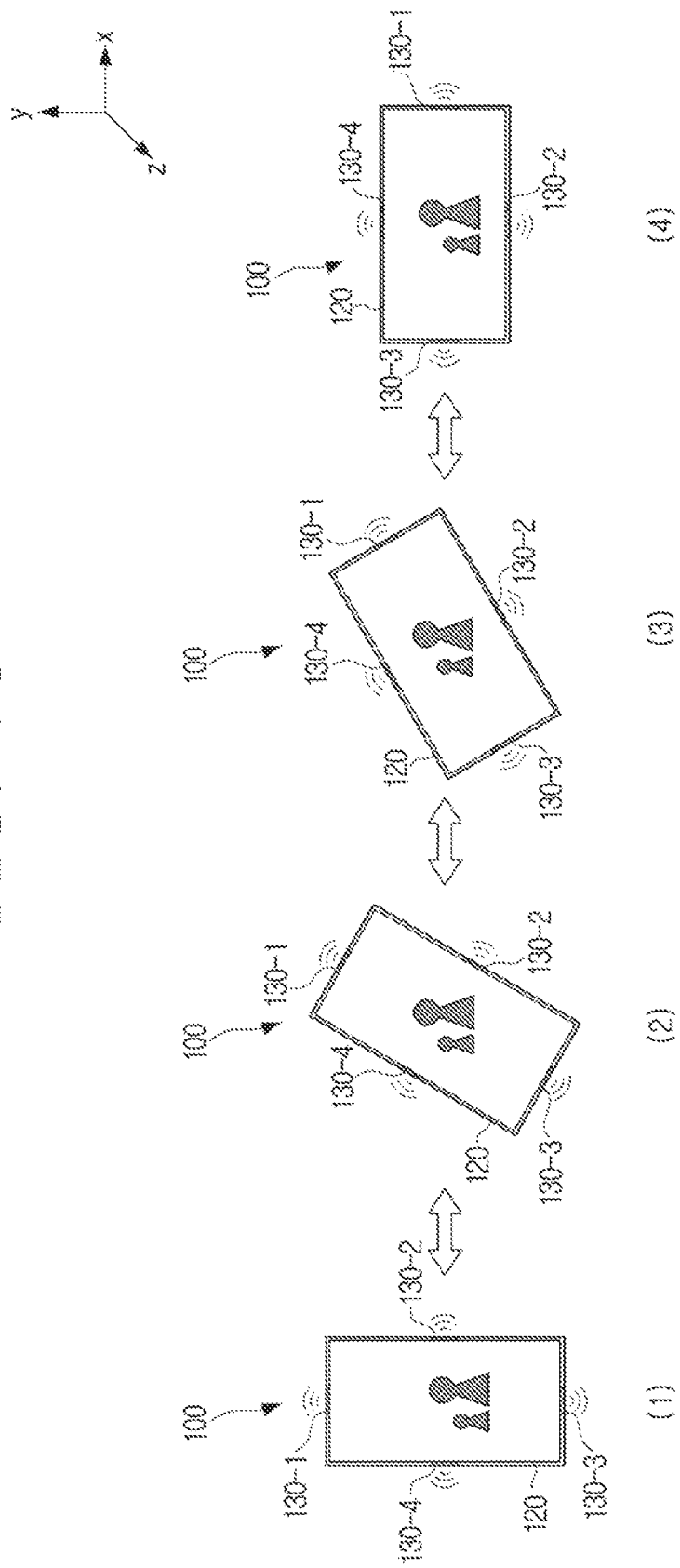

FIG. 8B

|  |  | (1) | (2) | (3) |
|---|---|---|---|---|
| 130-1 | FIRST SPEAKER | Channel Center | Mono Channel | Channel Right |
| 130-2 | SECOND SPEAKER | Channel Right | Mono Channel | Channel Bottom |
| 130-3 | THIRD SPEAKER | Channel Bottom | Mono Channel | Channel Left |
| 130-4 | FOURTH SPEAKER | Channel Left | Mono Channel | Channel Center |

FIG. 12B

|  | (1) | (2) | (3) |
|---|---|---|---|
| 130-1A — 1A-TH SPEAKER | Channel Center | Channel Center | Channel Right |
| 130-1B — 1B-TH SPEAKER | Channel Center | Channel Right | Channel Right |
| 130-2A — 2A-TH SPEAKER | Channel Right | Channel Right | Channel Bottom |
| 130-2B — 2B-TH SPEAKER | Channel Right | Channel Bottom | Channel Bottom |
| 130-3A — 3A-TH SPEAKER | Channel Bottom | Channel Bottom | Channel Left |
| 130-3B — 3B-TH SPEAKER | Channel Bottom | Channel Left | Channel Left |
| 130-4A — 4A-TH SPEAKER | Channel Left | Channel Left | Channel Center |
| 130-4B — 4B-TH SPEAKER | Channel Left | Channel Center | Channel Center |

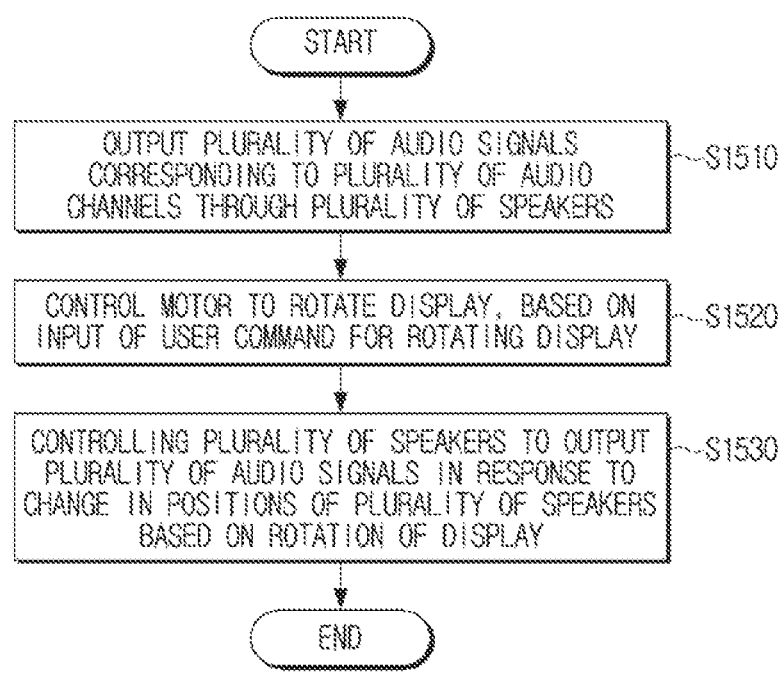

DISPLAY DEVICE AND CONTROL METHOD THEREOF

CROSS-REFERENCE TO RELATED APPLICATION(S)

This application is a continuation of U.S. application Ser. No. 16/875,176 filed on May 15, 2020, which is based on and claims priority under 35 U.S.C. § 119 to Korean Patent Application No. 10-2020-0044146, filed on Apr. 10, 2020, in the Korean Intellectual Property Office, and Korean Patent Application No. 10-2020-0052786, filed on Apr. 29, 2020, in the Korean Intellectual Property Office, the disclosures of which are herein incorporated by reference in their entirety.

BACKGROUND

Field

Apparatuses and methods consistent with the disclosure relate to a display device and a control method thereof, and more particularly, to a rotatable display device and a control method thereof.

Description of the Related Art

Recently, image contents of various aspect ratios have been produced. Accordingly, various display devices have been developed to optimize the aspect ratio of image contents.

A typical display device is optimized to display image contents having a longer landscape ratio (e.g., ratios of landscape and portrait of 16:9, 16:10, etc.), and as a result, the image content of the margins (e.g., left and right margins, in the opposite case, top and bottom margins) is not displayed on a screen of the display device when the image contents have a longer portrait ratio.

A rotatable display device may provide an optimized viewing experience for the image contents having a longer landscape ratio as well as the image contents having a longer portrait ratio by rotating a display to match the aspect ratio of the image contents. That is, the margin generated according to the ratio of the image contents may be minimized.

Meanwhile, when a speaker is provided in the rotatable display device, the speaker may be rotated together with the display. In this case, the speaker may output sound in an unwanted direction. In addition, when a direction in which the image contents are displayed on the display is changed, if the setting (e.g., an audio channel, etc.) of the sound output from the speaker remains the same, a suitable sound field, stereo effect, etc. may not be provided to the user.

As such, when the speaker is rotated together with the display, an audio setting different from that of the typical speaker in a non-rotating state is required.

SUMMARY

According to an aspect of an example embodiment, there is provided a display device including a motor, a display, a plurality of speakers provided in a plurality of regions of the display, and at least one processor. The at least one processor may be configured to output a plurality of audio signals corresponding to a plurality of audio channels to the plurality of speakers, control the motor to rotate the display, based on an input of a user command for rotating the display, and control the plurality of speakers to output the plurality of audio signals in response to a change in positions of the plurality of speakers based on a rotation of the display.

The plurality of speakers may be provided in the plurality of regions that are positioned in a plurality of different directions relative to a rotating shaft of the display, and the processor may be further configured to identify an audio channel corresponding to a position of each of the plurality of speakers and output an audio signal corresponding to the identified audio channel to each corresponding speaker, identify an audio channel corresponding to a changed position of each of the plurality of speakers based on the rotation of the display, and output an audio signal corresponding to the identified audio channel to each corresponding speaker.

The processor may be further configured to output a first audio signal corresponding to a first audio channel of the plurality of audio channels to a first speaker of the plurality of speakers, output a second audio signal corresponding to a second audio channel of the plurality of audio channels to a second speaker of the plurality of speakers, and output the second audio signal to the first speaker of the plurality of speakers based on a 90° rotation of the display. After a 90° rotation of the display the first speaker may be positioned in the same direction relative to the rotating shaft as a direction in which the second speaker was positioned relative to the rotating shaft before the 90° rotation of the display.

The processor may be further configured to identify a rotation angle of the display while the display is rotated according to the user command and identify a ratio at which the first and second audio signals are to be mixed based on the identified rotation angle, and output an audio signal mixed based on the identified ratio to the first speaker while the display is being rotated.

The processor may be further configured to control an image displayed on the display to rotate in a direction opposite to a direction in which the display is rotated based on the identified rotation angle of the display while the display is being rotated.

The processor may be further configured to output a synthesized audio signal to the plurality of speakers while the display is being rotated, the synthesized audio signal may include the plurality of audio signals that have been synthesized.

The processor may be further configured to output a first audio signal corresponding to a first audio channel of the plurality of audio channels to a first speaker of the plurality of speakers and output a second audio signal corresponding to a second audio channel of the plurality of audio channels to a second speaker of the plurality of speakers, and output the second audio signal through the first speaker of the plurality of speakers, based on the display being rotated by a predetermined critical angle smaller than 90°. After a 90° rotation of the display the first speaker may be positioned in the same direction relative to the rotating shaft as a direction in which the second speaker was positioned relative to the rotating shaft before the 90° rotation of the display.

The processor may be further configured to control the display to rotate by 90° and control an image displayed on the display to rotate in a direction opposite to a direction in which the display is rotated, based on an angle at which the display has been rotated surpassing the predetermined critical angle.

The plurality of speakers may be provided in each of the plurality of regions. The processor may be further configured to output a first audio signal corresponding to a first audio channel of the plurality of audio channels to a plurality of first speakers provided in a first region of the plurality of regions and output a second audio signal corresponding to a second audio channel of the plurality of audio channels to a plurality of second speakers provided in a second region of the plurality of regions, and output the second audio signal through the plurality of first speakers, based on a 90° rotation of the display. After a 90° rotation of the display the first region may be positioned the same direction relative to the rotating shaft as a direction in which the second region was positioned relative to the rotating shaft before the 90° rotation of the display.

The processor may be configured to output the second audio signal to a speaker of the plurality of first speakers that is adjacent to the second region and output the first audio signal to the remaining speakers of the plurality of first speakers, while the display is rotated according to the user command.

According to another aspect of an example embodiment, a control method of a display device may include outputting a plurality of audio signals corresponding to a plurality of audio channels through a plurality of speakers; controlling a motor to rotate a display, based on an input of a user command for rotating the display; and controlling the plurality of speakers to output the plurality of audio signals based on a change in positions of the plurality of speakers based on the rotation of the display.

The plurality of speakers may be provided in the plurality of regions that are positioned in a plurality of different directions relative to a rotating shaft of the display. The outputting may include identifying an audio channel corresponding to a position of each of the plurality of speakers and outputting an audio signal corresponding to the identified audio channel through each corresponding speaker, and the controlling the plurality of speakers may include identifying a changed audio channel corresponding to a changed position of each of the plurality of speakers based on the rotation of the display, and outputting an audio signal corresponding to the identified audio channel through each corresponding speaker.

The outputting may further include outputting a first audio signal corresponding to a first audio channel of the plurality of audio channels through a first speaker of the plurality of speakers and outputting a second audio signal corresponding to a second audio channel of the plurality of audio channels through a second speaker of the plurality of speakers. The controlling the plurality of speakers may further include controlling the first speaker to output the second audio signal based on a 90° rotation of the display. After a 90° rotation of the display the first speaker may be positioned in the same direction relative to the rotating shaft as a direction in which the second speaker was positioned relative to the rotating shaft before the 90° rotation of the display.

The controlling the plurality of speakers may further include identifying a ratio at which the first and second audio signals are to be mixed based on a rotation angle at which the display is rotated and controlling the first speaker to output an audio signal mixed based on the identified ratio through the first speaker while the display is being rotated.

An image displayed on the display may be controlled to rotate in a direction opposite to a direction in which the display is rotated based on the identified rotation angle of the display while the display is being rotated.

The controlling the plurality of speakers may further include, controlling the plurality of speakers to output a synthesized audio signal through the plurality of speakers while the display is being rotated, the synthesized audio signal may include the plurality of audio signals that have been synthesized.

The outputting may further include outputting a first audio signal corresponding to a first audio channel of the plurality of audio channels through a first speaker of the plurality of speakers and outputting a second audio signal corresponding to a second audio channel of the plurality of audio channels through a second speaker of the plurality of speakers. The controlling the plurality of speakers may further include outputting the second audio signal through the first speaker of the plurality of speakers, based on the display being rotated by a predetermined critical angle smaller than 90°. After a 90° rotation of the display the first speaker may be positioned in the same direction relative to the rotating shaft as a direction in which the second speaker was positioned relative to the rotating shaft before the 90° rotation of the display.

The display may be controlled to rotate by 90° and control an image displayed on the display to rotate in a direction opposite to a direction in which the display is rotated, based on an angle at which the display has been rotated surpassing the predetermined critical angle.

The plurality of speakers may be provided in each of the plurality of regions. The outputting may further include outputting a first audio signal corresponding to a first audio channel of the plurality of audio channels through a plurality of first speakers provided in a first region of the plurality of regions and outputting a second audio signal corresponding to a second audio channel of the plurality of audio channels through a plurality of second speakers provided in a second region of the plurality of regions. The controlling the plurality of speakers may further include controlling the plurality of first speakers to output the second audio signal, based a 90° rotation of the display. After the 90° rotation of the display the first region may be positioned the same direction relative to the rotating shaft as a direction in which the second region was positioned relative to the rotating shaft before the 90° rotation of the display.

The controlling the plurality of speakers may further include controlling a speaker of the plurality of first speakers that is adjacent to the second region to output the second audio signal and controlling the remaining speakers of the plurality of first speakers to output the first audio signal, while the display is rotated according to the user command.

According to yet another aspect of an example embodiment, there is provided a display device including a display, a first speaker provided in a first region of the display, a second speaker provided in a second region of the display, a third speaker provided in a third region of the display, and at least one processor. The at least one processor configured to output a first audio signals corresponding to a first audio channel to the first speaker speakers; output a second audio signals corresponding to a second audio channel to the second speaker; output a third audio signals corresponding to a third audio channel to the third speaker; and based on a rotation of the screen, output the first audio signal corresponding to the first audio channel to one of the second or third speakers that has moved closer to a position of the first speaker before the rotation, output the second audio signal corresponding to the second audio channel to one of the first or third speakers that has moved closer to a position of the second speaker before the rotation, and output the third audio signal corresponding to the third audio channel to one of the first or second speakers that has moved closer to a position of the third speaker before the rotation.

BRIEF DESCRIPTION OF THE DRAWINGS

The above and/or other aspects of the disclosure will be more apparent by describing certain embodiments of the disclosure with reference to the accompanying drawings, in which:

FIG. 6B is a table showing audio signals output from the speakers according to the multiple display orientations shown in FIG. 6A;

FIG. 6C is a diagram showing an image displayed on the display in multiple display orientations according to an embodiment of the disclosure;

FIG. 7A is a diagram showing positions of speakers in multiple display orientations according to an embodiment;

FIG. 7B is a table showing audio signals output from the speakers according to the multiple display orientations shown in FIG. 7A;

FIG. 7C is a diagram showing an image displayed on the display in multiple display orientations according to an embodiment;

FIG. 8B is describing table showing audio signals output from the speakers according to the multiple display orientations shown in FIG. 8A;

FIG. 12B is a table showing audio signals output from speakers according to the multiple display orientations shown in FIG. 12A;

FIG. 15 is a flowchart showing a control method of a display device according to an embodiment.

DETAILED DESCRIPTION

Figure 1:
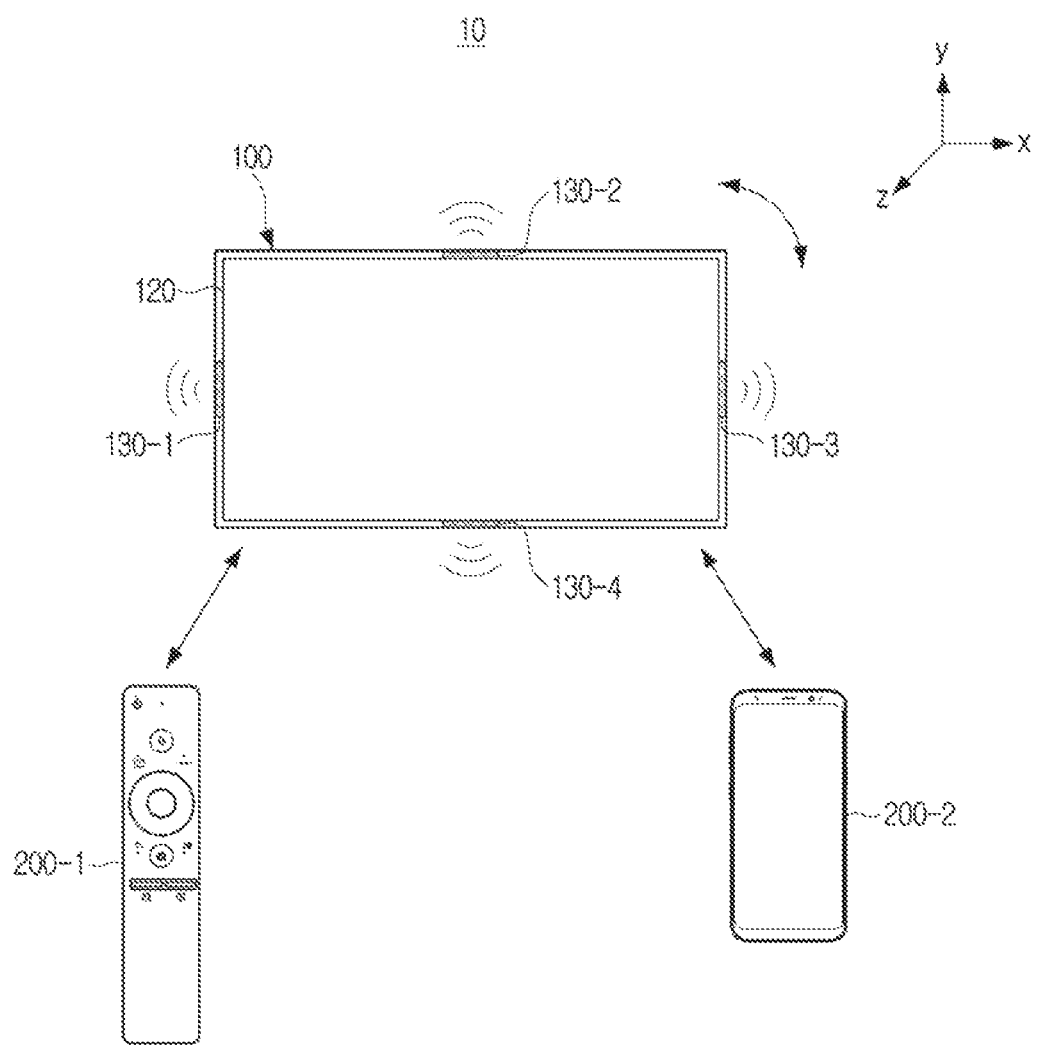
FIG. 1 is a diagram showing a display system according to an embodiment.

Since the disclosed embodiment may be modified and have several embodiments, specific example embodiments of the disclosure will be illustrated in the drawings and described in detail below. However, the disclosure is not limited to the specific example embodiments, but rather includes various modifications, equivalents, and/or alternatives of the example embodiments. Throughout the accompanying drawings, similar components will be denoted by similar reference numerals.

In describing the disclosure, when it is determined that a detailed description for well-known functions or configurations related to the disclosure may unnecessarily obscure the gist of the disclosure, the detailed description of the well-known functions or configurations may be omitted.

In addition, the following embodiments may be modified in several different forms, and the scope of the disclosure is not limited to the following embodiments. Rather, these embodiments make the disclosure thorough and complete, and are provided to completely transfer a technical understanding of the disclosure to those skilled in the art.

Terms used in the disclosure are used only to describe specific embodiments rather than limiting the scope of the disclosure. Singular forms are intended to include plural forms unless the context clearly indicates otherwise.

In the disclosure, the expressions "have", "may have", "include", or "may include" indicate existence of a corresponding feature (for example, a numerical value, a function, an operation, or a component such as a part), and do not exclude existence of an additional feature.

Expressions "first", "second", and the like, used in the disclosure may indicate various components regardless of a sequence and/or importance of the components, will be used only in order to distinguish one component from the other components, and do not limit the corresponding components.

In the disclosure, an expression "A or B", "at least one of A and/or B", "one or more of A and/or B", or the like, may include all possible combinations of items listed together. For example, "A or B", "at least one of A and B", or "at least one of A or B" may indicate all of 1) a case in which at least one A is included, 2) a case in which at least one B is included, or 3) a case in which both of at least one A and at least one B are included.

In the disclosure, the singular expression includes the plural expression unless the context clearly indicates otherwise. It should be further understood that the term "include" or "constituted" used in the application specify the presence of features, numerals, steps, operations, components, parts mentioned in the specification, or combinations thereof, but do not preclude the presence or addition of one or more other features, numerals, steps, operations, components, parts, or combinations thereof.

When it is mentioned that any component (for example, a first component) is (operatively or communicatively) coupled with/to or is connected to another component (for example, a second component), it is to be understood that any component is directly coupled with/to another component or may be coupled with/to another component through the other component (for example, a third component). On the other hand, when it is mentioned that any component (for example, a first component) is "directly coupled with/to" or "directly connected to" to another component (for example, a second component), it is to be understood that the other component (for example, a third component) is not present between any component and another component.

FIG. 1 is a diagram showing a display system according to an embodiment.

Referring to FIG. 1, a system 10 may include a display device 100 and external devices 200-1 and 200-2 communicating with the display device 100.

The display device 100 may be implemented as various display devices such as a TV, a smart TV, a monitor, a signage, an electronic picture frame, an electronic blackboard, an electronic table, a laptop computer, an integrated display computer, a personal digital assistant (PDA), a portable multimedia player (PMP), a large format display (LFD), a cinema display, an electric sign, a tablet computer, a smartphone, an instrument panel of a vehicle, and a dashboard. However, the display device 100 is not limited to the above-described examples and may be implemented as various electronic devices having a display.

Figure 2:
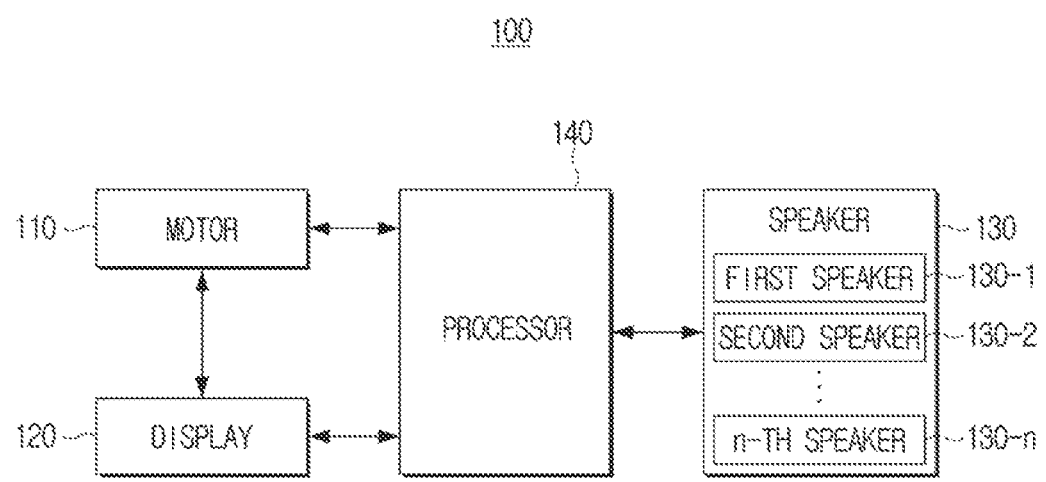
FIG. 2 is a block diagram of the display device according to an embodiment.

The display device 100 may include a display 120 and a plurality of speakers (130-1, 130-2, 130-3 and 130-4) (see FIG. 2).

When a user command for rotating the display 120 is input, the display device 100 may rotate the display 120. The user command may be input through an input device 150 (see FIG. 13) (e.g., a button, a touch panel, a microphone, etc.) provided in the display device 100, or may be input through the external devices 200-1 and 200-2 that perform communication (e.g., communication using infrared, NFC, Bluetooth, Wi-Fi, a server, etc.) with the display device 100. For example, as illustrated in FIG. 1, a first external device 200-1 may be implemented as a remote controller, and a second external device 200-2 may be implemented as a smartphone. However, this is only an example, and the external devices 200-1 and 200-2 may be implemented as various external devices such as a keyboard, a mouse, and a pen.

At this time, the user command (or event) may include various types of commands such as a command in which the user presses a specific button of the display device 100 (or the external devices 200-1 and 200-2), a command in which the user selects a menu displayed on the display 120 (or the external devices 200-1 and 200-2) through a button or a touch panel of the display device 100 (or the external devices 200-1 and 200-2), a command (gesture command) in which the user rotates the external devices 200-1 and 200-2, and a command (voice command) in which the user speaks a specific word.

In addition, the user command may include a command to control an image displayed on the external devices 200-1 and 200-2 to be displayed on the display 120. For example, when a screen is interlocked (shared) between the display device 100 and the external devices 200-1 and 200-2 through communication (mirroring, etc.), the display device 100 may receive images displayed on the external devices 200-1 and 200-2 from the external devices 200-1 and 200-2 and display the received images on the display 120. When a direction (e.g., a portrait (vertical) or landscape (horizontal) direction) of the images displayed on the external devices 200-1 and 200-2 is different from a direction (e.g., a portrait (vertical) or landscape (horizontal) direction) in which the display 120 is disposed, the display device 100 may rotate the display 120 in a direction that matches the direction of the images displayed on the external devices 200-1 and 200-2. In some embodiments, the image in the portrait (vertical) direction may represent an image in which a portrait (vertical) length is longer than a landscape (horizontal) length, and the image in the landscape (horizontal) direction may represent an image in which a portrait (vertical) length is shorter than a landscape (horizontal) length.

The display 120 may be rotated in a clockwise or counterclockwise direction in a state in which the screen on which the image is displayed is disposed toward a front axis (z axis). Here, the clockwise direction may refer to a direction of rotation from a vertical direction axis (y axis) to a horizontal direction axis (x axis), and the counterclockwise direction may refer to a direction rotated from the horizontal direction axis (x axis) to the vertical direction axis (y axis). That is, the clockwise direction and the counterclockwise direction may refer to a relationship of the directions opposite to each other.

In some non-limiting embodiments, the display 120 may be rotated to be disposed in one of the landscape direction and the portrait direction. The landscape direction (or landscape) may refer to an arrangement state of the display 120 in which a long axis of the display 120 aligns with the horizontal direction axis (x axis) and a short axis of the display 120 aligns with the vertical direction axis (y axis) as illustrated in FIG. 1 (or (2) of FIG. 4). Alternatively, the portrait direction (portrait) may refer to an arrangement state of the display 120 in which the long axis of the display 120 is aligned with the vertical direction axis (y axis) and the short axis of the display 120 is aligned with the horizontal direction axis (x axis) as illustrated in (1) of FIG. 4. That is, the arrangement in the landscape direction may indicate that the display 120 is disposed in a state in which the horizontal direction length of the display 120 is longer than the vertical direction length of the display 120, and the arrangement in the portrait direction may indicate that the display 120 is disposed in a state in which the horizontal direction length of the display 120 is shorter than the vertical direction length of the display 120.

The plurality of speakers 130 may be provided in a plurality of regions of the display device 100. For example, the plurality of speakers 130 may be provided in a plurality of side regions of the display 120. Referring to FIG. 1, the plurality of speakers 130 may include a first speaker 130-1 to a fourth speaker 130-4. In some non-limiting embodiments, the first speaker 130-1 may be positioned in a left region of the display 120 (or a left rear region of the display 120), the second speaker 130-2 may be positioned in an upper region of the display 120 (or an upper rear region of the display 120), the third speaker 130-3 may be positioned in a right region of the display 120 (or a right rear region of the display 120), and the fourth speaker 130-4 may be positioned in a lower region of the display 120 (or a lower rear region of the display 120). However, FIG. 1 shows a non-limiting example embodiment, and the number of speakers included in the plurality of speakers 130, the arrangement of each speaker, and a size of each speaker may be provided in various configurations.

The plurality of speakers 130 may be rotated together with the display 120 when the display 120 is rotated. That is, the plurality of speakers 130 may move to different positions and be directed in different directions when the display 120 is rotated. For example, each of the plurality of speakers 130 may be directed in a specific direction based on rotation of a rotating shaft 10 (see FIG. 4) of the display 120. The specific direction may be one of a left direction, a right direction, an upper direction, and a lower direction, but is not limited thereto, and may be one of various directions.

The plurality of speakers 130 may output a plurality of audio signals based on their positions when the display 120 is rotated. For example, when the display 120 is rotated 90 degrees in a clockwise direction, the first speaker 130-1 may move to a position corresponding to the second speaker 130-2 before rotation according to the rotation. When the position of the first speaker 130-1 is changed according to the rotation of 90 degrees in the clockwise direction, the first speaker 130-1 may be controlled to output an audio signal output from the second speaker 130-2 before rotation. Similarly, the second speaker 130-2 may be controlled to output an audio signal output from the third speaker 130-3 before rotation based on the position of the second speaker 130-2 changed according to the rotation of 90 degrees in the clockwise direction. The third speaker 130-3 and the fourth speaker 130-4 may similarly be controlled to output the audio of the speaker previously residing it their present position after a rotation of the display 120.

According to the non-limiting embodiment described above, a display device in which the audio signal is output according to the rotation (rotation direction, angle, etc.) of the display 120 is provided, as well as a control method thereof. In addition, because audio outputs of the plurality of speakers 130 are automatically changed when the display 120 is rotated, it is possible to provide a sound effect and a sound field such as stereo and surround.

FIG. 2 is a block diagram of the display device according to an embodiment.

Referring to FIG. 2, an embodiment of the display device 100 may include a motor 110, a display 120, a plurality of speakers 130-1 through 130-n, and a processor 140.

The motor 110 may rotate the display 120. In some non-limiting embodiments, the motor 110 may be coupled to the display 120 and may transmit a rotational force in a clockwise or counterclockwise direction to rotate the display 120 in a desired direction. In other non-limiting embodiments, the motor 110 may be connected to a gear (e.g., a circular gear) coupled with the display 120.

In some non-limiting embodiments, the motor 110 may refer to an electric motor that receives electrical energy (or power) and converts the received electrical energy into kinetic energy (or rotational force). To this end, the motor 110 may be implemented as various motors such as an alternating current (AC) motor using AC as a driving power source, and a direct current (DC) motor using DC as the driving power source. The AC motor may generally refer to a motor constructed by using an armature as a stator and using a field magnet as a rotor, and the DC motor may generally refer to a motor constructed by using the field magnet as the stator and the armature as the rotor. The stator may refer to a fixed portion, and the rotor may refer to a portion connected to a power load (i.e., the display 120 or the gear connected to the display 120) to supply the rotational force. The field magnet may refer to a portion of a winding that generates a magnetic flux, and the armature may refer to a portion of the winding where a voltage (electromotive force) is induced while breaking the magnetic flux.

The display 120 may display various images such as broadcast content and multimedia content. In some non-limiting embodiments, the image may be at least one of a still image or a video, and may be received from the outside of the display device 100 or may be stored in the display device 100. In addition, the display 120 may display various user interfaces (UIs), icons, figures, characters, and the like.

The display 120 may be implemented as various types of displays such as a liquid crystal display (LCD) that controls the degree (brightness of light or intensity of light) to which light emitted from a backlight unit is transmitted through a liquid crystal by using a separate backlight unit (e.g., light emitting diode (LED), etc.) as a light source and controlling a molecular arrangement of the liquid crystal, or a display that uses a self-luminescent element (e.g., a mini LED with a size of 100 to 200 µm, a micro LED with a size of 100 µm or less, an organic LED (OLED), a quantum dot LED (QLED), etc.) as a light source without a separate backlight unit or a liquid crystal.

In addition, the display 120 may include a plurality of driving circuits corresponding to a plurality of pixels. The driving circuit may be implemented in a form such as amorphous silicon (a-Si), a thin film transistor (TFT), a low temperature poly silicon (LTPS) TFT, or an organic TFT (OTFT). In addition, the pixel may be a minimum unit constituting an image, and each pixel may appear as a point having a specific color and brightness according to a voltage (or current) applied from a corresponding driving circuit.

In some non-limiting embodiments, the display 120 may be a flexible display having a characteristic in which a certain portion is bent, folded, or unfolded again, or the display 120 may be a transparent display having a characteristic of making an object visible by transmitting the object located behind the display 120.

In some non-limiting embodiments, the display 120 may be a touch screen (or touch panel) in combination with a touch detector (or touch sensor) that identifies a touch position of a user. The touch detector may be implemented in various ways such as a resistive type that identifies the touch position of the user by detecting physical pressure on a surface of the display 120, a capacitive type that identifies the touch position of the user by a change in an electrical signal on the surface of the display 120, and an electromagnetic wave way that identifies the touch position by detecting that electromagnetic waves (e.g., infrared rays, ultrasonic waves, etc.) emitted in the form of a grid on the surface of the display 120 are blocked by obstacles (e.g., a user's finger, pen, etc.).

The display 120 may be rotated according to the driving of the motor 110. Specifically, the display 120 may be rotated in a clockwise or counterclockwise direction around the rotating shaft 10 (see FIGS. 4 and 5) according to the driving of the motor 110. In some non-limiting embodiments, the rotating shaft 10 may be positioned at a geometric center of the display 120, but is not limited thereto and may be positioned at another position of the display 120.

The plurality of speakers 130 may be provided in a plurality of regions of the display 120.

The plurality of speakers 130 may include a first speaker 130-1 to an n-th speaker 130-n. In some non-limiting embodiments, n may be a natural number of 2 or more. The same description may be applied to each of the plurality of speakers 130, unless otherwise specified, and accordingly, hereinafter, the overlapping contents will be omitted and the n-th speaker 130-n will be described on behalf of other speakers for convenience of description.

The n-th speaker 130-n may output an audio signal. Here, the audio signal may refer to a signal represented by converting a voice (or sound) into an electrical waveform signal. Outputting the audio signal may include converting the electrical waveform signal into a sound wave or acoustic wave. For example, the n-th speaker 130-n may generate the sound wave by moving a diaphragm back and forth under the control of the processor 140 based on the audio signal. The sound wave may have a specific frequency and amplitude. For example, a high frequency (reciprocal of a period) of the sound wave may indicate that a pitch (or height) of the sound is a high pitch, and a large amplitude of the sound wave may indicate that a loudness of sound (level or sound volume) is high.

The processor 140 may control an overall operation of the display device 100. For example, the processor 140 may be a general-purpose processor such as a central processing unit (CPU), an application processor (AP) or the like, a graphic dedicated processor such as a graphic processing unit (GPU), a vision processing unit (VPU), or the like, and an artificial intelligence dedicated processor such as a neural processing unit (NPU). In addition, the processor 140 may include a volatile memory for loading at least one instruction or module.

The processor 140 may control the plurality of speakers 130 to output a plurality of audio signals corresponding to a plurality of audio channels. For example, when a user command for rotating the display 120 is input, the processor 140 may control the motor 110 to rotate the display 120. To compensate for a change in the positions of the speakers 130 based on the rotations of the display 120, the processor 140 may control the plurality of speakers 130 to output the plurality of audio signals based on the positions of the plurality of speakers 130 changed by the rotation of the display 120. This will be described in detail with reference to FIGS. 3 to 5.

Figure 3:
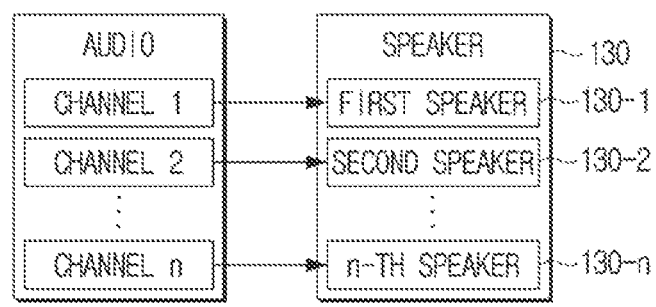
FIG. 3 is a block diagram showing a relationship between audio channels and speakers according to an embodiment.

FIG. 3 is a diagram showing a relationship between audio channels and speakers according to an embodiment.

Referring to FIG. 3, the processor 140 may control the plurality of speakers 130 to output a plurality of audio signals corresponding to a plurality of audio channels. Each audio channel may be output through one speaker (one of 130-1 through 130-n), and the processor 140 may control the plurality of speakers 130 to simultaneously output the plurality of audio signals corresponding to the plurality of audio channels.

In some non-limiting embodiments, the processor 140 may control a first speaker 130-1 to output an audio signal of a first audio channel, control a second speaker 130-2 to simultaneously output an audio signal of a second audio channel, . . . , and control an n-th speaker 130-n to simultaneously output an audio signal of an n-th audio channel.

In some non-limiting embodiments, each audio channel may include an audio signal classified according to a frequency band (low/middle/high frequency band) or spatial sound (left/right/center, etc.). The audio signal included in each audio channel may be different from the audio signals included in other audio channels.

For example, when the plurality of audio channels provide stereo audio. Accordingly, the plurality of audio channels may include a left audio channel and a right audio channel. The left audio channel may include an audio signal representing a sound of a left space based on the user's position (or display 120), and the audio signal of the left audio channel may be output through the first speaker 130-1 positioned on the left side based on the display 120. In addition, the right audio channel may include an audio signal representing a sound of a right space based on the user's position (or display 120), and the audio signal of the right audio channel may be output through the second speaker 130-2 positioned on the right side based on the display 120.

As another example, when the plurality of audio channels include four audio channels, the plurality of audio channels may include a front left audio channel (hereinafter, referred to as an L audio channel), a front center audio channel (hereinafter, referred to as a C audio channel), a front right audio channel (hereinafter, referred to as a R audio channel), and a bottom (or rear surround) audio channel (hereinafter, referred to as a B audio channel). In the same manner as described in the above example, the L audio channel may include an audio signal representing a sound of a left space (or a front left space) based on the user's position (or display 120), the C audio channel may include an audio signal representing a sound of a middle space (or human's dialogue, etc.), the R audio channel may include an audio signal representing a sound of a right space (or a front right space) based on the user's position (or display 120), and the B audio channel may include an audio signal representing a sound of a rear space (or background sound, effect sound, etc.). Each channel may be output by a respective speaker 130 based on the position of the speaker at the time the audio is output.

As described above, because the display device 100 may output a plurality of audio channels through the plurality of speakers 130, it is possible to provide the user with a more stereoscopic human's dialogue/voice, background sound/effect sound, and the like, resulting in the user experiencing a three-dimensional sound field effect and a sense of space.

According to the number, arrangement, etc. of the plurality of speakers 130, the plurality of audio channels may be provided in various forms such as stereo and multi-channels (e.g., 2.1 audio channel, 4 audio channel, 5.1 audio channel, 7.1 audio channel, etc.), but in the following embodiments, for convenience of description, the plurality of audio channels are presented as multi-channels having four audio channels, unless otherwise specified.

Figure 4:
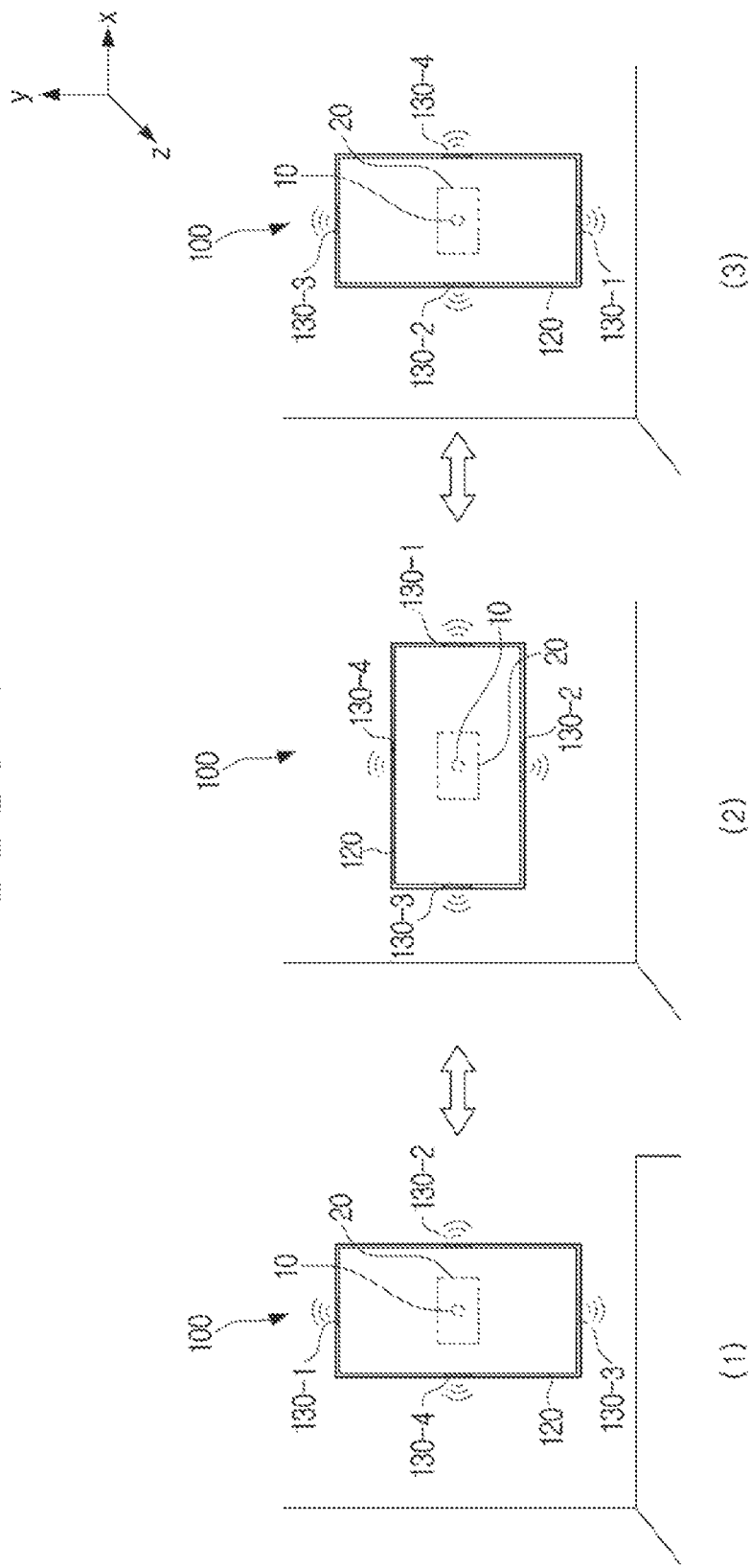
FIG. 4 is a diagram showing a rotatable display in multiple orientations according to an embodiment.
Figure 5:
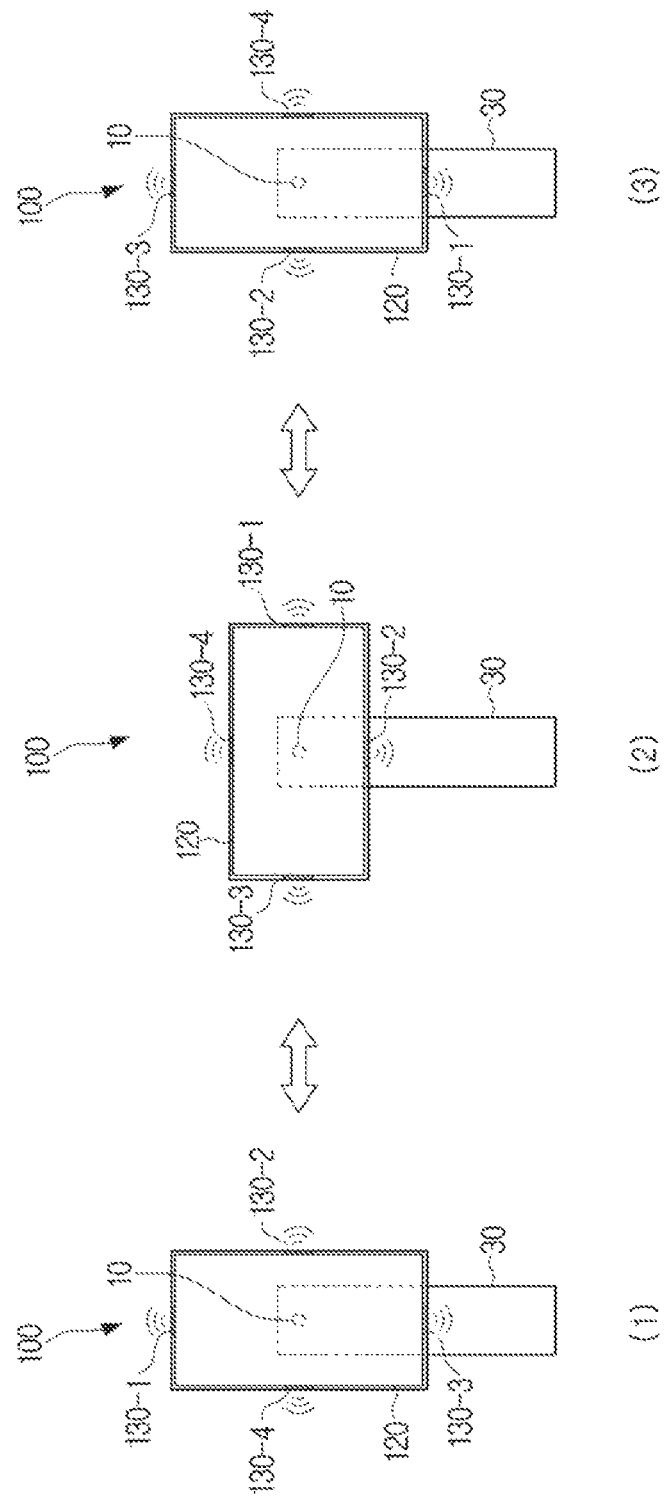
FIG. 5 is a diagram showing a rotatable display in multiple orientations according to an embodiment.

FIGS. 4 and 5 are diagrams for describing a rotatable display according to an embodiment.

Referring to FIGS. 4 and 5, when a user command for rotating the display 120 is input, the processor 140 may control the motor 110 to rotate the display 120.

The processor 140 may control the motor 110 to rotate the display 120 at a specific rotation angle. For example, the processor 140 may control the motor 110 to rotate the display 120 at the specific rotation angle by applying a pulse signal in which a width (length/ratio of time during which a high signal (voltage, etc.) is applied for an entire period) is adjusted to the motor through a pulse width modulation (PWM) method. For example, the width of the pulse signal may be determined based on a weight of the display 120, a torque of the motor 110, a gear ratio, and the like. In addition, the rotation angle may be +90 degrees (clockwise direction) or −90 degrees (counterclockwise direction). For example, when the processor 140 transmits a pulse signal for rotating the display 120 at an angle of +90 degrees to the motor 110, the display 120 may be gradually rotated in the clockwise direction from 0 to 90 degrees according to the driving of the motor 110 based on the pulse signal. The above description is directed at an example embodiment, and it is possible for the processor 140 to control the motor 110 according to other methods known in the art.

In some non-limiting embodiments, the display device 100 may further include a rotating shaft 10 and supports 20 or 30.

The rotating shaft 10 may rotate the display 120 by transmitting the rotational force provided by the motor 110 to the display 120. Accordingly, the rotating shaft 10 may be coupled to the motor 110 and the supports 20 or 30. In some non-limiting embodiments, a separate bearing may be positioned outside the rotating shaft 10. The bearing may provide for smooth rotation of the rotating shaft 10 by fixing the rotating shaft 10 at a predetermined position and reducing a frictional force associated with rotating the rotating shaft 10 while supporting a load applied to the rotating shaft 10. In some non-limiting embodiments, the rotating shaft 10 may be a rotating shaft of the motor 110 or a rotating shaft separate from the rotating shaft of the motor 110.

The supports 20 and 30 may support the display device 100. In some non-limiting embodiments, the supports 20 and 30 may include brackets of a video electronics standards association (VESA) standard (e.g., landscape and portrait of 100×100 mm, 200×100 mm, 400×400 mm, etc.) or brackets for the display device 100 only. For example, as shown in FIG. 4, the support 20 may be a wall-hanging support for fixing the display device 100 to a wall, or as shown in FIG. 5, the support 30 may be a stand for erecting the display device 100 on a floor (or ground). Further, the supports 20 and 30 may be an arm attached (or fastened) to a desk or the like, and may be detached (removed) from the desk. In some non-limiting embodiments, the supports 20 and 30 may include the motor 110 therein.

Since the display device 100 may rotate the display 120 through the driving of the motor 110 rather than an external force of the user, the user convenience may be improved. In particular, when the display device 100 has a large display, the user may more conveniently rotate the display 120 through a user command (gesture, user voice, etc.) when the display device 100 is positioned at a position out of the reach of the user. In addition, because the user's hand does not touch the display device 100, it is possible to prevent a user's fingerprint, contaminants, and the like from contacting the display device 100 due to the user.

When the display 120 is rotated by the motor 110, the plurality of speakers 130 may also be rotated with the display 120. For example, the display 120 may be rotated 90 degrees by the motor 110. As such, the positions of the plurality of speakers 130 may be changed as the plurality of speakers 130 are rotated with the display 120.

The processor 140 may control the plurality of speakers 130 to output the plurality of audio signals based on the change in the positions of the plurality of speakers 130 after the rotation of the display 120. That is, when the positions of the plurality of speakers 130 are changed based on the display 120 being rotated, the processor 140 may change the audio channel output according to the position of each of the plurality of speakers 130.

The plurality of speakers 130 may be provided in a plurality of regions and directed in a plurality of different directions in relation to the rotating shaft 10 of the display 120. For example, the plurality of regions may include a first region positioned in an upper direction, a second region positioned in a right direction, a third region positioned in a lower direction, and a fourth region positioned in a left direction, in relation to the rotating shaft 10 of the display 120.

The plurality of regions may be moved to different positions having different directions based on a rotation direction of the display 120. For example, when the display 120 is rotated in the clockwise direction, the plurality of speakers 130 (or the plurality of regions) may be sequentially moved to positions corresponding to the upper direction, the right direction, the lower direction, and the left direction in relation to the rotating shaft 10. Alternatively, when the display 120 is rotated in the counterclockwise direction, the plurality of speakers 130 (or the plurality of regions) may be sequentially moved to positions corresponding to the upper direction, the left direction, the lower direction, and the right direction in relation to the rotating shaft 10.

In some non-limiting embodiments, the processor 140 may identify an audio channel corresponding to the position of each of the plurality of speakers 130. Based on this information, the processor 140 may control each speaker 130 to output an audio signal corresponding to the identified audio channel.

For example, the plurality of audio channels may include a C audio channel, an L audio channel, an R audio channel, and a B audio channel. In a state in which the display 120 is disposed in a portrait direction as illustrated in (1) of FIGS. 4 and 5, the processor 140 may identify an audio channel corresponding to a positional relationship of the first speaker 130-1 among the plurality of audio channels.

For example, the processor 140 may identify the C audio channel representing a sound in the upper direction corresponding to the upper direction in which the first speaker 130-1 is positioned relative to the rotating shaft 10 of the display 120, as an audio channel to be output from the first speaker 130-1. In this case, the processor 140 may control the first speaker 130-1 to output an audio signal included in the identified C audio channel through the corresponding first speaker 130-1.

In this way, the processor 140 may control the second to fourth speakers 130-2 to 130-4 so that the second speaker 130-2 positioned in the right direction outputs an audio signal of the R audio channel representing a sound in the right direction, the third speaker 130-3 positioned in the lower direction outputs an audio signal of the B audio channel representing a sound in the lower direction, and the fourth speaker 130-4 positioned in the left direction outputs an audio signal of the L audio channel representing a sound in the left direction, by identifying the audio channel corresponding to the positional relationship of each of the plurality of speakers 130.

When the position of each of the plurality of speakers 130 is changed according to the rotation of the display 120, the processor 140 may identify an audio channel corresponding to the changed position. In this case, the processor 140 may control each speaker to output an audio signal corresponding to the identified audio channel based on the respective positions on the plurality of speakers 130.

For example, the processor 140 may control the first speaker 130-1 to output a first audio signal corresponding to the first audio channel, and may control the second speaker 130-2 to output a second audio signal corresponding to the second audio channel.

When the display 120 is rotated by 90°, the processor 140 may control the first speaker 130-1 to output the second audio signal. At this time, when the display 120 has been rotated by 90°, the first speaker 130-1 may be positioned in the same position that the second speaker 130-2 was positioned in relation to the rotating shaft 10 before the display 120 was rotated.

For example, when the display 120 is rotated by 90° in the clockwise direction from the arrangement state (i.e., an arrangement state in the portrait direction) of the display 120 shown in (1) of FIGS. 4 and 5, the display 120 and the plurality of speakers 130 may be changed to an arrangement state (i.e., an arrangement state in the landscape direction) shown in (2) of FIGS. 4 and 5.

As shown in (2) of FIGS. 4 and 5, based on a 90 degrees rotation of the rotating shaft 10, the first speaker 120-1 may be positioned in a first region existing in the right direction, the second speaker 130-2 may be positioned in a second region existing in the lower direction, the third speaker 130-3 may be positioned in a third region existing in the left direction, and the fourth speaker 130-4 may be positioned in a fourth region existing in the upper direction. In this case, when the positions of the plurality of speakers 130 are changed based on rotation of the display 120, the processor 140 may identify the R audio channel representing a sound in the right direction corresponding to the right direction in which the first speaker 130-1 is positioned, and may control the first speaker 130-1 to output an audio signal of the identified R audio channel.

Similarly, the processor 140 may control the second to fourth speakers 130-2 to 130-4 so that the second speaker 130-2 positioned in the lower direction outputs an audio signal of the B audio channel representing a sound in the lower direction, the third speaker 130-3 positioned in the left direction outputs an audio signal of the L audio channel representing a sound in the left direction, and the fourth speaker 130-4 positioned in the upper direction outputs an audio signal of the C audio channel representing a sound in the upper direction, by identifying the audio channel corresponding to the changed position of each speaker.

Thereafter, when the display 120 is rotated by 90 degrees in the clockwise direction, the arrangement state may be changed the arrangement state shown in (3) of FIGS. 4 and 5, and in the same way as described above, the processor 140 may control the plurality of speakers 130 to output the plurality of audio signals based on the positions of the plurality of speakers 130 changed according to the rotation of the display 120.

In the above description, it is assumed that the number of the plurality of speakers 130 and the number of the plurality of audio channels are the same. However, the number of the plurality of speakers 130 and the number of the plurality of audio channels may be different.

For example, when the number of the plurality of speakers 130 is four and the number of the plurality of audio channels is two, the processor 140 may control four speakers so that two of the four speakers output two audio channels (e.g., L audio channel and R audio channel). That is, some of the plurality of speakers may output the plurality of audio channels (e.g., L audio channel and R audio channel).

Referring to (1) of FIG. 4, when the display 120 is arranged in the portrait direction, the processor 140 may control the fourth speaker 130-4 positioned in the left direction to output the audio signal corresponding to the L audio channel and the second speaker 130-2 positioned in the right direction to output the audio signal corresponding to the R audio channel. Similarly, the processor 140 may control the first speaker 130-1 positioned in the upper direction and the third speaker 130-3 positioned in the lower direction not to output the audio channel.

When the display 120 is rotated by 90 degrees in the clockwise direction and the display 120 is arranged in the landscape direction, as shown in (2) of FIG. 4, the processor 140 may control the third speaker 130-3 positioned in the left direction to output the audio signal corresponding to the L audio channel and the first speaker 130-1 positioned in the right direction to output the audio signal corresponding to the R audio channel, based on the position of each speaker changed according to the rotation of the display 120. Similarly, the processor 140 may control the fourth speaker 130-4 positioned in the upper direction and the second speaker 130-2 positioned in the lower direction not to output the audio channel.

As another example, when the number of the plurality of speakers 130 is four and the number of the plurality of audio channels is two, the processor 140 may control four speakers to output one audio channel per two speakers. That is, all of the plurality of speakers 130 may be controlled to output audio signals. In this case, two of the four speakers may output a first audio channel and the other two speakers may output a second, different audio channels (e.g., L audio channel, R audio channel, etc.).

When the display 120 is rotated, the processor 140 may change the audio channel output from each of the four speakers according to the position of each speaker based on to the rotation of the display 120.

Hereinafter, a method of adjusting an audio channel output from each of the plurality of speakers 130 while the display 120 is rotated will be described with reference to FIGS. 6A to 8B.

Figure 6A:
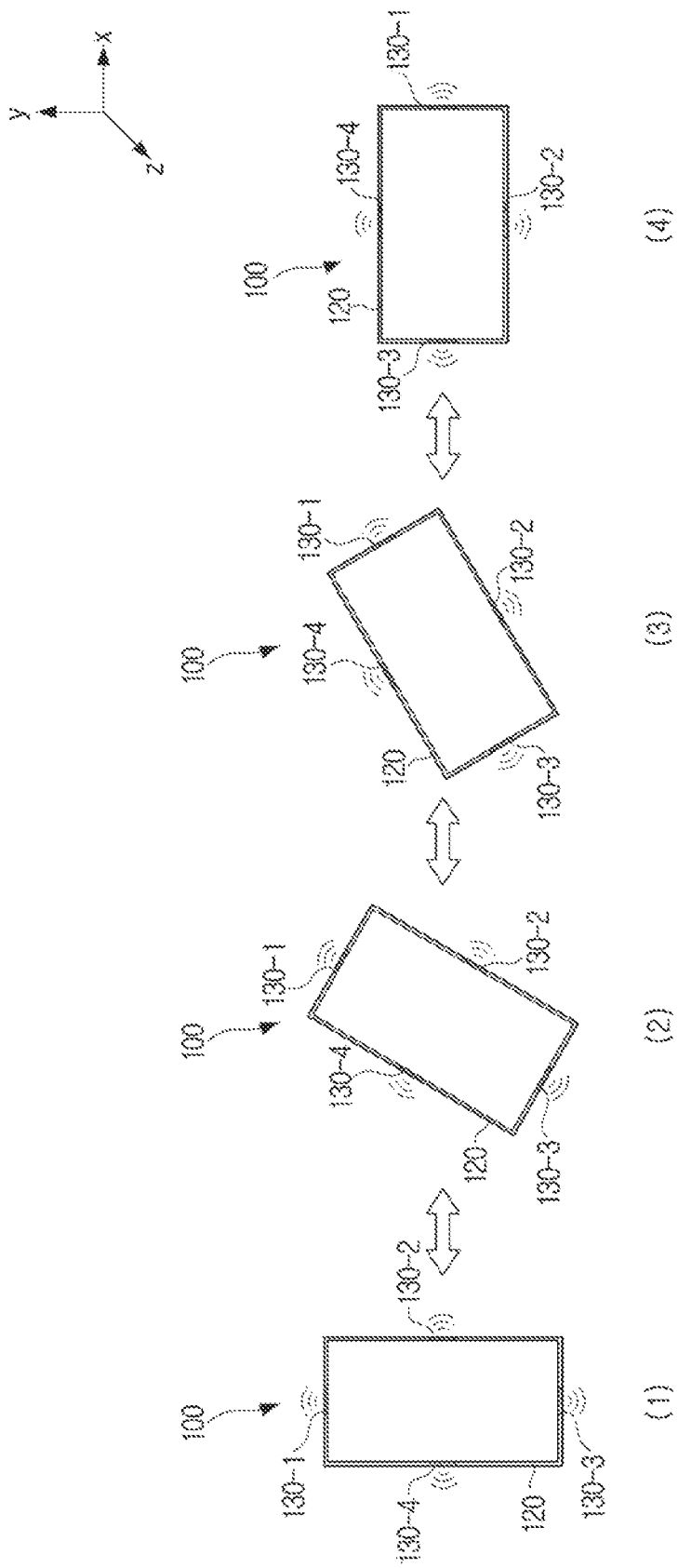
FIG. 6A is a diagram showing positions of speakers in multiple display orientation according to an embodiment.

FIG. 6A is a diagram showing changes in the positions of the speakers as the display is rotated according to an embodiment. FIG. 6B is a table showing audio signals output from the speakers as the display of FIG. 6A is rotated. FIG. 6C is a diagram showing an image displayed on the display as the display is rotated according to an embodiment.

(1) of FIGS. 6A to 6C represents a state in which the display 120 is disposed in the portrait direction, (2) of FIGS. 6A to 6C represents a state in which the display 120 is rotated by 30 degrees in the clockwise direction from the state of (1), (3) of FIGS. 6A to 6C represents a state in which the display 120 is rotated by 45 degrees in the clockwise direction from the state of (1), and (4) of FIGS. 6A to 6C represents a state in which the display 120 is rotated by 90 degrees in the clockwise direction from the state of (1).

Referring to (1) of FIGS. 6A to 6C, the processor 140 may control the first speaker 130-1 to output a first audio signal corresponding to the first audio channel through the first speaker 130-1, and may control the second speaker 130-2 to output a second audio signal corresponding to the second audio channel through the second speaker 130-2.

The processor 140 may control the motor 110 to rotate the display 120 according to a user command for rotating the display 120. In this case, when the display 120 is rotated by 90 degrees in the clockwise direction, the display 120 may be sequentially rotated from (1) to (2), (3), and (4) of FIGS. 6A to 6C over a duration of time.

According to an embodiment, the processor 140 may identify a rotation angle of the display 120 while the display 120 is rotated according to the user command for rotating the display 120. For example, when the user command for rotating the display 120 is input, the processor 140 may periodically transmit a pulse signal having a specific width to the motor 110 to rotate the display 120 through driving of the motor 110. In this case, the processor 140 may identify the rotation angle (or rotation speed, rotation direction, etc.) of the display 120 based on a period at which the pulse signal is transmitted and the width of the pulse signal. In addition, the processor 140 may also identify a current position of each of the plurality of speakers 130 changed according to the rotation of the display 120 based on an initial position value (default value) and the rotation angle corresponding to each of the plurality of speakers 130.

When the display 120 is identified as being rotated by a predetermined critical angle smaller than 90°, the processor 140 may output the second audio signal through the first speaker 130-1 of the plurality of speakers 130. At this time, when the display 120 is rotated by 90°, the first speaker 130-1 may be positioned in the same direction the second speaker 130-2 was positioned relative to the rotating shaft 10 before the display 120 is rotated.

That is, prior to the 90 degrees rotation the second speaker 130-2 may have been in the position of the first speaker 130-1 after the rotation. For example, the direction in which the first speaker 130-1 is positioned relative to the rotating shaft 10 after the display 120 is rotated by 90 degrees may coincide with the direction in which the second speaker 130-2 was positioned relative to the rotating shaft 10 before the display 120 was rotated.

The critical angle may refer to an angle in which the display 120 is changed resulting in the first audio signal output from the first speaker 130-1 is output from the second speaker 130-2. The critical angle may be a predetermined angle greater than 0 degrees and smaller than 90 degrees. For example, in some non-limiting embodiments the critical angle may be set to 45 degrees. In other non-limiting embodiments, the critical angle may differ.

When the display 120 is rotated to the state of (2), which is a rotation angle smaller than the example critical angle (e.g., 45 degrees), from (1) of FIGS. 6A and 6C, the processor 140 may identify that the rotation angle of the display 120 is 30 degrees. The processor 140 may identify that the display 120 is rotated at a rotation angle (30 degrees)

smaller than the critical angle (45 degrees) by comparing the critical angle (45 degrees) and the rotation angle (30 degrees) of the display 120. In this case, the processor 140 may maintain the audio signals of the audio channels output from the first to fourth speakers 130-1 to 130-4, in the same as the state of (1) before the display 120 is rotated.

In addition, assuming that the display 120 is rotated to the state of (3), which is the same rotation angle as the critical angle (e.g., 45 degrees), from (1) of FIGS. 6A and 6C, the processor 140 may identify that the rotation angle of the display 120 is 45 degrees, and may identify that the display 120 is rotated at the same rotation angle (45 degrees) as the critical angle (45 degrees) by comparing the critical angle (45 degrees) and the rotation angle (45 degrees) of the display 120. In this case, the processor 140 may identify the audio channel corresponding to the position of the first speaker 130-1, which was changed as the display 120 rotated, as the R audio channel, and may control the first speaker 130-1 to output the audio signal of the R audio channel. Here, the R audio channel output from the first speaker 130-1 may be an audio channel output from the second speaker 130-2 before the display 120 is rotated. Similarly, the processor 140 may control the second speaker 130-2 to output the audio signal of the B audio channel, control the third speaker 130-3 to output the audio signal of the L audio channel, and control the fourth speaker 130-4 to output the audio signal of the C audio channel.

In addition, assuming that the display 120 is rotated to the state of (4), which is a rotation angle greater than the critical angle (e.g., 45 degrees), from (1) of FIGS. 6A and 6B, the processor 140 may identify that the rotation angle of the display 120 is 90 degrees, and may identify that the display 120 is rotated at the rotation angle (90 degrees) greater than the critical angle (45 degrees) by comparing the critical angle (45 degrees) and the rotation angle (90 degrees) of the display 120. In this case, the processor 140 may maintain the audio signals of the audio channels output from the first to fourth speakers 130-1 to 130-4, in the same as the state of (3) in which the display 120 is rotated at the critical angle.

Referring to FIG. 6C, if it is identified that the display 120 has been rotated by a predetermined critical angle, the processor 140 may control the display 120 to rotate by 90° and rotate an image displayed on the display 120 in a direction opposite to the direction in which the display 120 is rotated.

The critical angle may refer to an angle in which the display 120 is rotated the results in the image displayed on the display 120 being rotated. In addition, the critical angle may be the same angle as the example critical angle described above in FIGS. 6A and 6B.

That is, if it is identified that the display 120 has been rotated to the state of (3), which is the same rotation angle as the example critical angle, from (1) of FIGS. 6A and 6B, the processor 140 may control the display 120 to rotate by 90° and rotate the image displayed on the display 120 in the direction opposite to the direction in which the display 120 is rotated.

Accordingly, the display device 100 according to an embodiment may match or sync the directionality of the sound and image. That is, both the audio signals of the audio channels output from the plurality of speakers 130 and the image are rotated together, when the rotation angle of the display 120 reaches the critical angle as the display 120 is rotated, and may thus provide a natural viewing experience to the user while the display 120 rotates.

In addition, the display device 100 according to an embodiment may identify the rotation (e.g., rotation angle, rotation speed, rotation direction, etc.) of the display 120 based on a signal for controlling the motor 110, and may thus accurately identify the rotation of the display 120 without a separate sensor. However, the display device 100 is not limited thereto, and may also include a separate sensor capable of detecting rotation.

FIG. 7A is a diagram showing changes in positions of the speakers as the display is rotated, according to an embodiment. FIG. 7B is a table showing audio signals output from the speakers as the display is rotates according to an embodiment. FIG. 7C is a diagram showing an image displayed on the display as the display is rotated according to an embodiment.

(1) of FIGS. 7A to 7C represents a state in which the display 120 is disposed in the portrait direction, (2) of FIGS. 7A to 7C represents a state in which the display 120 is rotated by 30 degrees in the clockwise direction from the state of (1), (3) of FIGS. 7A to 7C represents a state in which the display 120 is rotated by 45 degrees in the clockwise direction from the state of (1), and (4) of FIGS. 7A to 7C represents a state in which the display 120 is rotated by 90 degrees in the clockwise direction from the state of (1).

Referring to FIGS. 7A and 7B, the processor 140 may control the first speaker 130-1 to output a first audio signal corresponding to the first audio channel, and may control the second speaker 130-2 to output a second audio signal corresponding to the second audio channel.

In addition, the processor 140 may control the motor 110 to rotate the display 120 according to a user command for rotating the display 120. In this case, when the display 120 is rotated by 90 degrees in the clockwise direction, the display 120 may be sequentially rotated from (1) to (2), (3), and (4) of FIGS. 7A to 7C over a duration of time.

In the embodiment of FIGS. 7A-7C, the processor 140 may identify a rotation angle of the display 120 while the display 120 is rotated according to the user command for rotating the display 120. In this case, the processor 140 may identify the rotation angle (or rotation speed, rotation direction, etc.) of the display 120 based on a period at which a pulse signal is transmitted and a width of the pulse signal, but is not limited thereto, and may identify the rotation angle of the display 120 in various ways.

In addition, the processor 140 may identify a ratio in which the first and second audio signals are mixed based on the identified rotation angle.

In some non-limiting embodiments, the processor 140 may identify a ratio of the first audio signal corresponding to the first speaker 130-1 through a mathematical expression such as "(90 degrees-rotation angle)/90 degrees*100%", and may identify a ratio of the second audio signal corresponding to the first speaker 130-1 through a mathematical expression such as "(rotation angle)/90 degrees*100%". Here, the first audio signal corresponding to the first speaker 130-1 may be an audio signal output from the first speaker 130-1 in the state of (1) before the display 120 is rotated. In addition, the second audio signal corresponding to the first speaker 130-1 may be output from the first speaker 130-1 in the state shown in (4) in which the display 120 has been rotated by 90 degrees.

For example, if the rotation angle of the display 120 is 20 degrees, the processor 140 may identify that the ratio of the first audio signal corresponding to the first speaker 130-1 is "(90 degrees-20 degrees)/90 degrees*100%=about 78%", and the ratio of the second audio signal corresponding to the first speaker 130-1 is "(20 degrees)/90 degrees*100%=about 22%".

Accordingly, the processor 140 may identify a ratio in which the plurality of audio signals corresponding to the first to fourth speakers 130-1 to 130-4 are mixed according to the rotation angles of the display 120 as shown in (1) to (4) of FIGS. 7A and 7B.

In addition, the processor 140 may control the first speaker 130-1 to output the audio signal mixed based on the identified ratio through the first speaker 130-1 while the display 120 is rotated. When the display 120 is rotated by 90°, the first speaker 130-1 may be a speaker positioned in the same direction as a direction in which the second speaker 130-2 is positioned relative to the rotating shaft 10 before the display 120 was rotated.

In some non-limiting embodiments, the processor 140 may mix the audio signals according to the identified ratio. Here, the mixing may indicate synthesizing (or superimposing) the audio signals. For example, the processor 140 may generate the mixed audio signal by synthesizing (or superimposing, adding) a "waveform of the first audio signal multiplied by the ratio of the first audio signal" and a "waveform of the second audio signal multiplied by the ratio of the second audio signal".

As such, when the display 120 is gradually rotated, the display device 100 may gradually adjust the ratio of the audio signals (audio channels) according to the rotation angle to output the audio signals from the plurality of speakers 130, thereby preventing the immersive feeling of the user listening to the sound from being deteriorated. In addition, even when the display 120 gradually rotates, the display device 100 may provide the sound to the user while maintaining a three-dimensional a sound field effect and a sense of space.

In reference to FIG. 7C, the processor 140 may control the display 120 to rotate and control an image displayed on the display 120 to rotate in a direction opposite to the direction in which the display 120 is rotated while the display 120 is rotated based on the rotation angle of the display 120.

That is, the processor 140 may control the display 120 to rotate and control the displayed image to rotate in the direction opposite to the rotation direction of the display 120 by the rotation angle at which the display 120 is rotated.

Accordingly, in the eyes of the user, it looks as if an orientation of the image is maintained constant regardless of the rotation of the display 120. As such, the display device 100 according to the disclosure may prevent a user's immersive feeling for an image viewing from being deteriorated according to the rotation of the display 120.

In some non-limiting embodiments, the display device 100 may match or sync the directionality of the image and sound by gradually rotating the image displayed on the display 120 according to the rotation angle of the display 120 and gradually adjusting the ratio of the audio signals output from the plurality of speakers 130 at the same time, and may thus provide a natural viewing experience to the user even while the display 120 rotates.

Figure 8A:
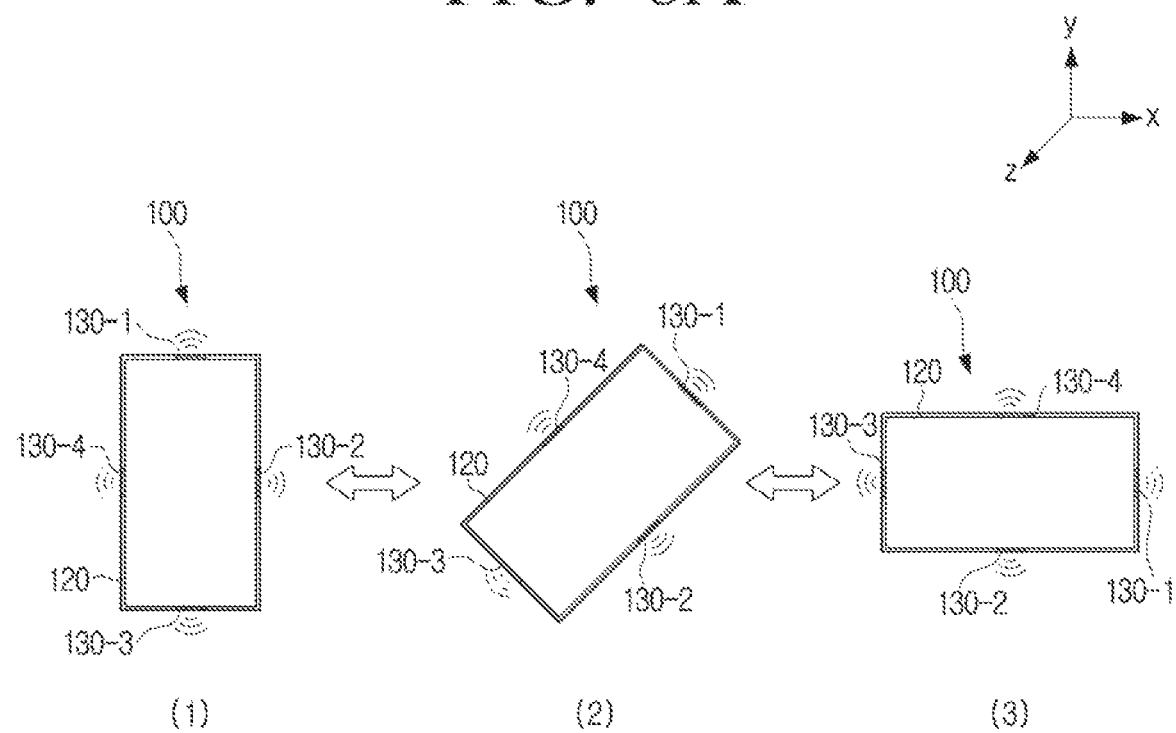
FIG. 8A is a diagram showing positions of speakers in multiple display orientations according to an embodiment.

FIG. 8A is a diagram showing changes in the positions of the speakers as the display is rotated according to an embodiment. FIG. 8B is a table showing audio signals output from the speakers as the display is rotated according to an embodiment.

(1) of FIGS. 8A and 8B represents a state in which the display 120 is disposed in the portrait direction, (2) of FIGS. 8A and 8B represents a state in which the display 120 is rotated by 30 degrees in the clockwise direction from the state of (1), and (3) of FIGS. 8A and 8B represents a state in which the display 120 is rotated by 90 degrees in the clockwise direction from the state of (1).

The processor 140 may control the plurality of speakers 130 to output an audio signal in which the plurality of audio signals are synthesized through the plurality of speakers 130 while the display 120 is rotated.

The audio signal in which the plurality of audio signals are synthesized may be an audio signal corresponding to a mono channel synthesized by superimposing waveforms of the plurality of audio signals included in the plurality of audio channels.

That is, as illustrated in (2) of FIGS. 8A and 8B (when the rotation of the display 120 proceeds from (1) to (3) in FIGS. 8A and 8B), the processor 140 may control the plurality of speakers 130 to output the audio signal corresponding to the mono channel through the plurality of speakers 130 while the display 120 is rotated.

Figure 9:
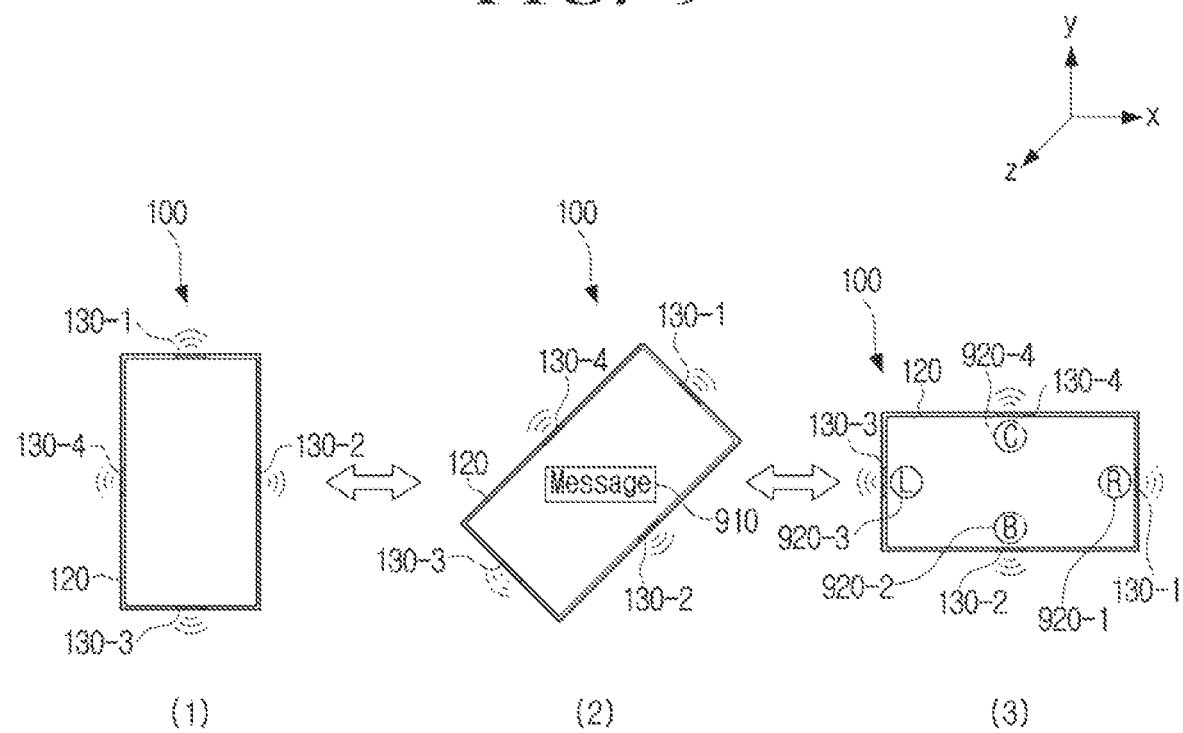
FIG. 9 is a diagram showing a user interface (UI) displayed on the display according to an embodiment.

FIG. 9 is a diagram showing a user interface (UI) displayed on the display according to an embodiment.

(1) of FIG. 9 shows a state in which the display 120 is disposed in the portrait direction, (2) of FIG. 9 shows a state in which the rotation in the clockwise direction proceeds from the state of (1), and (3) of FIG. 9 shows a state in which the rotation in the clockwise direction from the state of (1) is completed.

Referring to (2) of FIG. 9, the processor 140 may control the display 120 to display a first user interface (UI) 910 while the display 120 is rotated. The first UT 910 may inform the user that the display 120 is being rotated or that the audio signals output from the plurality of speakers 130 are adjusted according to the rotation of the display 120. The first UI 910 may be implemented in various forms such as a message, an image, and a highlight effect. For example, the first UT 910 may include a message such as "the speaker output is reset according to the rotation". Alternatively, the first UT 910 may include information about the audio signals output from the plurality of speakers 130. However, this is only an example, and the first UI 910 may be implemented in various forms.

Referring to (3) of FIG. 9, when the rotation of the display 120 is completed, the processor 140 may control the display 120 to display a second user interface (UI) 920. In addition, when a predetermined time (e.g., n seconds, n is a natural number, etc.) has elapsed from a time point at which the rotation of the display 120 is completed, or when a user command is input, the processor 140 may control the display 120 to remove (not to display) the second UI 920 displayed on the display 120. Here, the second UI 920 is to inform the user that the rotation of the display 120 is completed or that the audio signals output from the plurality of speakers 130 are adjusted according to the rotation of the display 120, and the second UI 920 may be implemented in various forms such as a message, an image, and a highlight effect. As an example, the second UI 920 may include a message such as "the speaker output is reset according to the rotation". Alternatively, the second UI 920 may include information about the audio signals output from the plurality of speakers 130. However, this is only an example, and the second UI 920 may be implemented in various forms.

As such, the display device 100 more intuitively provide information (or feedback) according to the rotation of the display 100 to the user using a visual element such as a message or a graphic.

The plurality of speakers 130 according to an embodiment of the disclosure may be implemented in the form of various numbers, sizes, and arrangements as shown in the non-limiting embodiments provided in FIGS. 10 to 12B.

Figure 10:
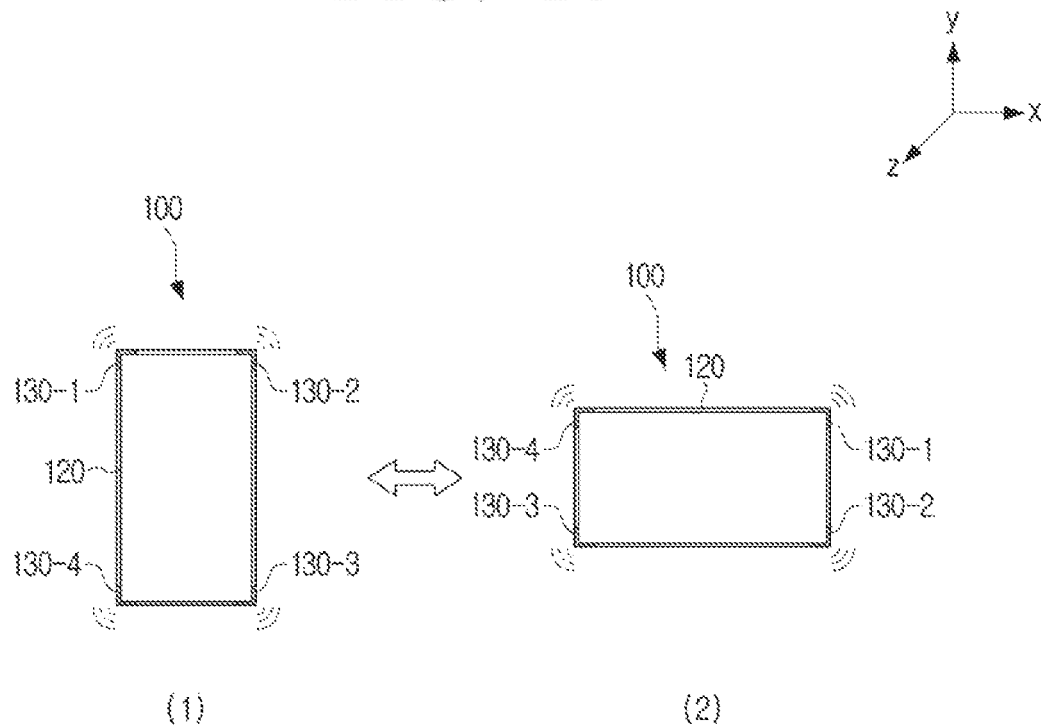
FIG. 10 is a diagram showing an arrangement of the speakers in multiple display orientations according to an embodiment.

FIG. 10 is a diagram showing an arrangement of the speakers according to an embodiment.

Referring to FIG. 10, when the plurality of speakers 130 includes four speakers, each of the first speaker 130-1 to the fourth speaker 130-4 may be respectively provided in one of an upper left corner region of the display 120, an upper right corner region of the display 120, a lower left corner region of the display 120, and a lower right corner region of the display 120. Even when the positions in which the plurality of speakers 130 are disposed differently than described above, the description of the embodiment described above may be applied in the same way.

Specifically, in a state in which the display 120 is disposed as shown in (1) of FIG. 10, the audio signal of the first audio channel representing an upper left direction may be output from the first speaker 130-1 positioned in the upper left direction, and the audio signal of the second audio channel representing an upper right direction may be output from the second speaker 130-2 positioned in the upper right direction. In this way, the first to fourth audio channels are output from each of the first to fourth speakers 130-1 to 130-4.

When the display 120 is rotated by 90 degrees in the clockwise direction as shown in (2) of FIG. 10, the processor 140 may control the first speaker 130-1 to output the second audio channel representing the upper right direction corresponding to the upper right direction in which the first speaker 130-1 is positioned according to the rotation of the display 120. In this way, the audio signals of the audio channels output from the plurality of speakers 130 may be changed according to the rotation of the display 120.

Figure 11:
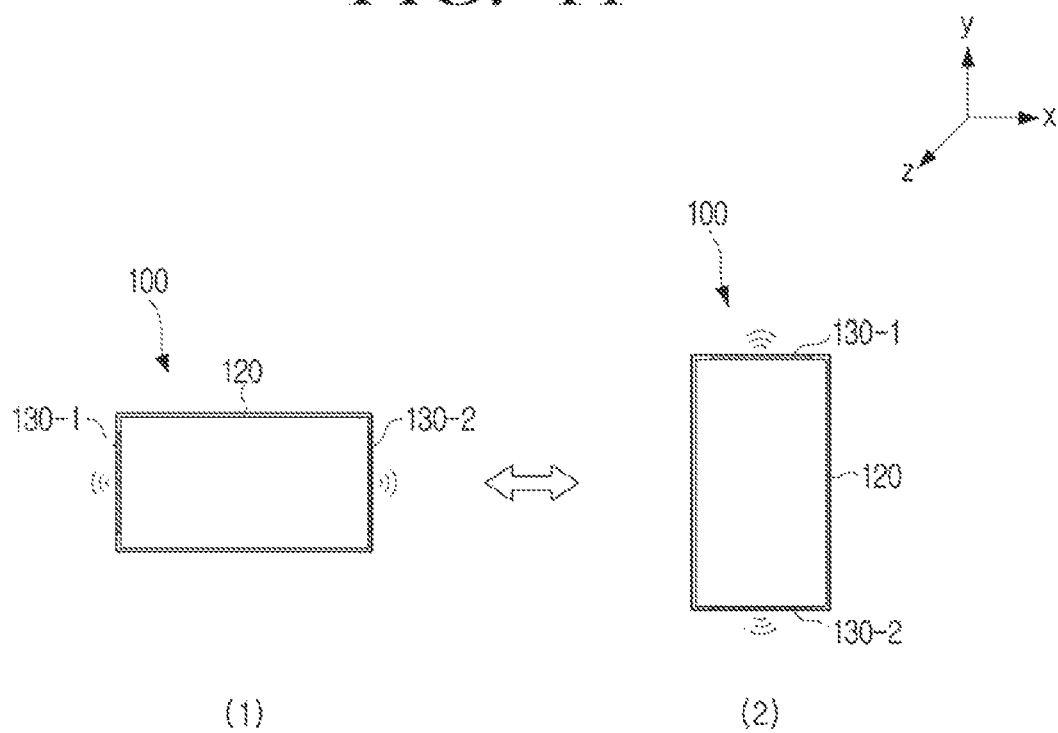
FIG. 11 is a diagram showing an arrangement of the speakers in multiple display orientations according to an embodiment.

FIG. 11 is a diagram showing an arrangement of the speakers according to an embodiment.

Referring to FIG. 11, when the plurality of speakers 130 are implemented as two speakers 130-1 and 130-2, each of the first speaker 130-1 and the second speaker 130-2 may be provided in a left region of the display 120 and a right region of the display 120, as shown in (1) of FIG. 11. Here, the plurality of audio channels may provide stereo audio, such as an L audio channel for providing a sound effect in a left space and an R audio channel for providing a sound effect in a right space.

As shown in (1) of FIG. 11, when the first speaker 130-1 and the second speaker 130-2 are identified as being positioned on the left and right sides of the display 120, the processor 140 may control the first speaker 130-1 and the second speaker 130-2 to output the L audio channel through the first speaker 130-1 positioned in the left region of the display 120 and output the R audio channel through the second speaker 130-2 positioned in the right region of the display 120.

In addition, as illustrated in (2) of FIG. 11, when the display 120 is rotated according to the user command and the first speaker 130-1 and the second speaker 130-2 are positioned in the upper and lower directions based on the display 120, the processor 140 may generate an audio signal corresponding to a mono channel by synthesizing the plurality of audio signals included in the L audio channel and the R audio channel. In addition, the processor 140 may control the first speaker 130-1 and the second speaker 130-2 to output the audio signal corresponding to the mono channel.

When the audio channels providing the sound effects in the left and right spaces through the first speaker 130-1 and the second speaker 130-2 positioned in the upper and lower directions based on the rotating shaft 10 of the display 120 are output, the sound effects become unnatural. By converting and outputting the audio signal of stereo to the audio signal of the mono channel, a more natural sound effect may be provided to the user.

When the display 120 is rotated according to the user command and is changed to the state as shown in (1) of FIG. 11, the processor 140 may control the first speaker 130-1 positioned in the left region of the display 120 to output the L audio channel and the second speaker 130-2 positioned in the right region of the display 120 output the R audio channel through. Accordingly, the display device 100 may provide stereo audio.

As such, the display device 100 may provide an optimal sound effect by outputting the audio signal corresponding to one of the mono channel and a multi-channel (stereo, surround, etc.) according to an arrangement structure of the plurality of speakers 130.

Figure 12A:
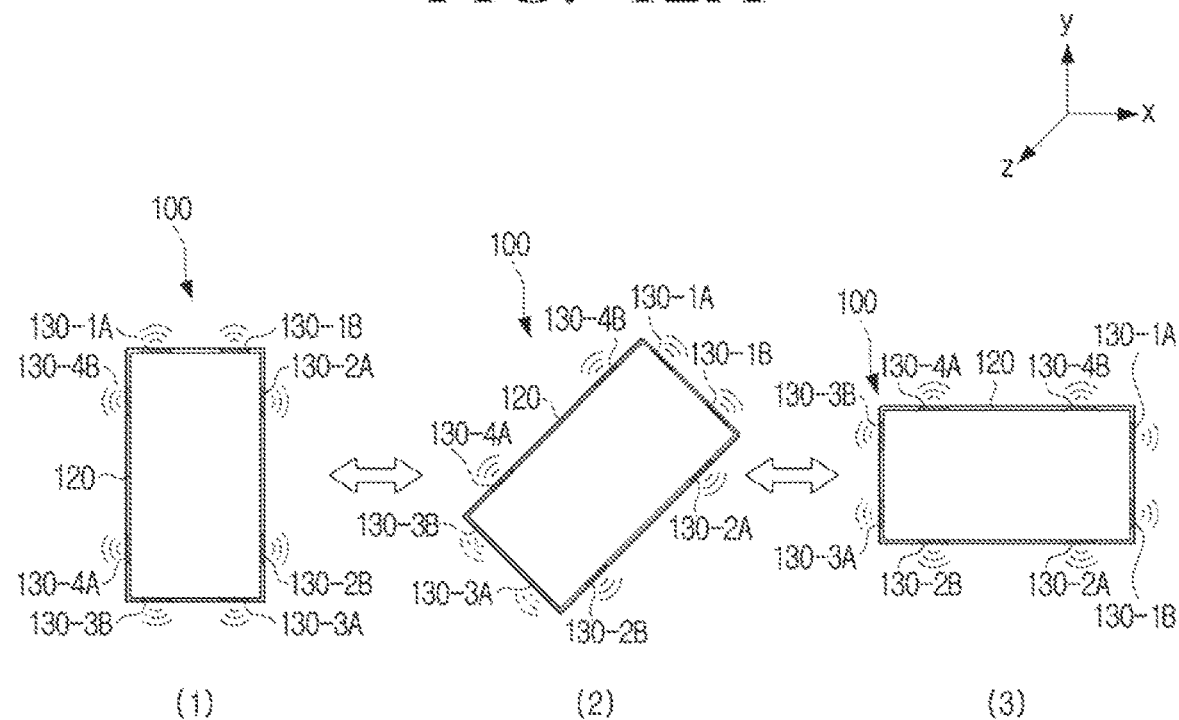
FIG. 12A is a diagram showing an arrangement of the speakers in multiple display orientations according to an embodiment.

FIG. 12A is a diagram showing an arrangement of the speakers according to an embodiment. FIG. 12B is a table showing audio signals output from speakers as the display is rotated according to an embodiment of the disclosure.

(1) of FIGS. 12A and 12B represents a state in which the display 120 is disposed in the portrait direction, (2) of FIGS. 12A and 12B represents a state in which the display 120 is rotated by 30 degrees in the clockwise direction from the state of (1), and (3) of FIGS. 12A and 12B represents a state in which the display 120 is rotated by 90 degrees in the clockwise direction from the state of (1).

Referring to FIGS. 12A and 12B, the plurality of speakers 130 may include a plurality of speakers provided in each of a plurality of regions. Here, the plurality of regions may be side regions of the display 120 (or side regions of the rear surface of the display 120).

In this case, the processor 140 may output a first audio signal corresponding to the first audio channel through a plurality of first speakers 130-1A and 130-1B provided in a first region of the plurality of regions, and may output a second audio signal corresponding to the second audio channel among the plurality of audio channels through a plurality of second speakers 130-2A and 130-2B provided in a second region of the plurality of regions.

For example, in the state of (1) of FIGS. 12A and 12B, the first region may be an upper region of the display 120, and the plurality of first speakers 130-1A and 130-1B may be positioned in the first region and output the C audio channel. The second region may be a right region of the display 120, and the plurality of second speakers 130-2A and 130-2B may be positioned in the second region and output the R audio channel. The third region may be a lower region of the display 120, and the plurality of third speakers 130-3A and 130-3B may be positioned in the third region and output the B audio channel. The fourth region may be a left region of the display 120, and the plurality of fourth speakers 130-4A and 130-4B may be positioned in the fourth region and output the L audio channel.

When the display 120 is rotated by 90°, the processor 140 may output the second audio signal through the plurality of first speakers 130-1A and 130-1B. At this time, when the display 120 has been rotated by 90°, the first region may be a region positioned in the same direction as a direction in which the second region was positioned relative to the rotating shaft 10 before the display 120 was rotated. That is, the second region may be a region adjacent to the first region in the rotation direction.

For example, when the display 120 is rotated by 90° as shown in (3) relative to the state of (1) of FIGS. 12A and 12B, the processor 140 may output the audio signal of the R audio channel through the plurality of first speakers 130-1A and 130-1B. In the same way, the processor 140 may output the audio signal of the B audio channel through the plurality of second speakers 130-2A and 130-2B, output the audio signal of the L audio channel through the plurality of third speakers 130-3A and 130-3B, and output the audio signal of the C audio channel through the plurality of fourth speakers 130-4A and 130-4B.

Here, while the display 120 is rotated according to the user command, the processor 140 may output the second audio signal through the speaker 130-1B, which is adjacent to the second region, and output the first audio signal through the remaining speaker 130-1A.

For example, while the display 120 is rotated as shown in (2) relative to the state of (1) of FIGS. 12A and 12B, the processor 140 may output the R audio signal through the speaker 130-1B which is adjacent to the second region in the rotation direction and output the C audio signal through the remaining speaker 130-1A. In the same way, the processor 140 may output the B audio signal through the speaker 130-2B which is adjacent to the third region in the rotation direction, and output the R audio signal through the remaining speaker 130-2A; output the L audio signal through the speaker 130-3B which is adjacent to the fourth region in the rotation direction, and output the B audio signal through the remaining speaker 130-3A; and output the C audio signal through the speaker 130-4B which is adjacent to the first region in the rotation direction, and output the L audio signal through the remaining speaker 130-4A.

As such, even if there are the plurality of speakers in one region, the display device 100 may implement a smoother sound transition because the speaker existing in the rotation direction outputs the audio signal of the audio channel corresponding to the adjacent region in the rotation direction while the display 120 rotates.

Figure 13:
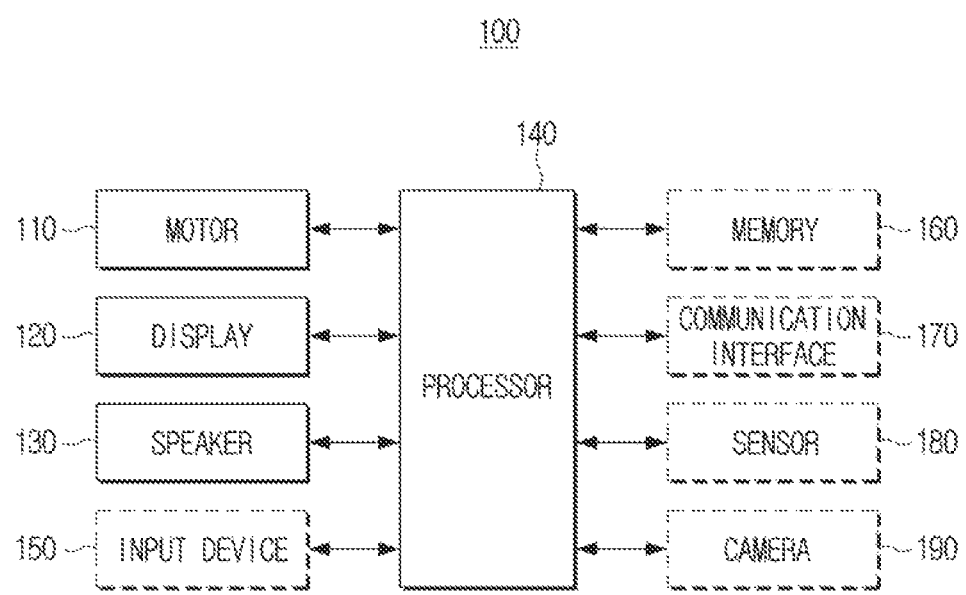
FIG. 13 is a block diagram showing components of an electronic device according to an embodiment.

FIG. 13 is a block diagram showing additional components of an electronic device according to an embodiment.

Referring to FIG. 13, the display device 100 may further include at least one of an input device 150, a memory 160, a communication interface 170, a sensor 180, or a camera 190, in addition to the motor 110, the display 120, the plurality of speakers 130, and the processor 140.

The input device 150 may receive various user commands and transmit the received user commands to the processor 140. That is, the processor 140 may recognize a user command input from the user through the input device 150. Here, the user command may be implemented in various ways, such as a user's touch input (touch panel), a key (keyboard) or button (physical button or mouse) input, and a user voice (microphone).

Specifically, the input device 150 may include, for example, at least one of a touch panel (not illustrated), a pen sensor (not illustrated), a key (not illustrated), or a microphone (not illustrated). The touch panel may use at least one of, for example, a capacitive type, a resistive type, an infrared type, or an ultrasonic type, and to this end, the touch panel may also include a control circuit. The touch panel may further include a tactile layer to provide a tactile reaction to the user. The pen sensor may be, for example, a portion of the touch panel or may include a separate sheet for recognition. The key may include, for example, a physical button, an optical key, or a keypad. The microphone may directly receive a user's voice, and may acquire an audio signal by converting the user's voice, which is an analog signal, into a digital by a digital converter (not illustrated). The above listed input devices are provided as examples of input devices, and the processor 140 may also receive the user command by communicating with an external device (e.g., a Bluetooth keyboard, a mouse, a pen, a remote controller, a smartphone, etc.) through the communication interface 170.

The memory 160 is a component in which various information (or data) may be stored. For example, the memory 160 may store the information in an electric form or a magnetic form.

Specifically, at least one instruction, module, or data necessary for the operation of the display device 100 or the processor 140 may be stored in the memory 160. Here, the instruction may be written in machine language that may be understood by the display device 100 or the processor 140, as a unit directing the operation of the display device 100 or the processor 140. A module may be a set of sub-instructions configuring a software program (or operating system, application, dynamic library, runtime library, etc.), but this is only an example, and the module may be the program itself. The data may be materials in units of bits or bytes that may be processed by the display device 100 or the processor 140 to represent information such as letters, numbers, sounds, and images.

The communication interface 170 may transmit and receive various types of data by performing communication with various types of external devices according to various types of communication methods. The communication interface 170 is a circuit that performs various types of wireless communication, and may include at least one of an Ethernet module or a USB module that performs wired communication with a Bluetooth chip (Bluetooth type), a Wi-Fi chip (Wi-Fi type), a wireless communication chip (cellular type such as 3G, 4G, 5G, etc.), an NFC chip (NFC type), an IR chip (infrared type), and an ultrasonic communication chip (ultrasound type). In this case, the Ethernet module and the USB module that perform wired communication may communicate with the external devices through an input/output port.

The sensor 180 may refer to a device that detects the amount or change of various physical signals (e.g., temperature, light, sound, chemicals, electricity, magnetism, pressure, etc.). Here, the detected signal may be converted into data in a format that the processor 140 may interpret.

The sensor 180 may be implemented as various sensors such as a proximity sensor, an illuminance sensor, a temperature sensor, a humidity sensor, a motion sensor, a ToF (time of flight) sensor, and a GPS (global positioning system) sensor.

Here, the proximity sensor may detect the presence of a surrounding object, thereby acquiring data on whether or not the surrounding object is present or whether or not the surrounding object is in proximity. The illuminance sensor may detect the amount of light (or brightness) for a surrounding environment of the display device 100, thereby acquiring data on illuminance. The temperature sensor may detect a temperature of a target object or a temperature (e.g., indoor temperature, etc.) of the surrounding environment of the display device 100 according to heat radiation (or photon). In some non-limiting embodiments, the temperature sensor may be implemented as an infrared camera or the like. The humidity sensor may detect the amount of water vapor in air through various methods such as color change, ion amount change, electromotive force, and current change due to a chemical reaction in the air, thereby acquiring data on humidity. The motion sensor may detect a moving distance, a moving direction, and a tilt of the display device 100. In some embodiments, the motion sensor may be implemented by combining an acceleration sensor, a gyro sensor, a geomagnetic sensor, and the like. The time of flight (TOF) sensor may detect a return time of flight after emitting various electromagnetic waves (e.g., ultrasonic waves, infrared rays, lasers, etc.) having a specific speed, thereby acquiring data on a distance (or position) from the target. The global positioning system (GPS) sensor may receive radio wave signals from a plurality of satellites, calculate a distance from each satellite by using a transmission time of the received signal, and acquire data on a current position of the display device 100 by using triangulation on the calculated distance.

However, the sensor 180 described above is only provided as an example, and is not limited thereto, and it may be implemented as various types of sensors.

The camera 190 may classify light into pixel units, detect the intensity of light for red (R), green (G), and blue (B) colors for each pixel, convert the intensity of light into an electrical signal, thereby acquiring data representing an object's color, shape, and contrast. At this time, the type of data may be an image having R, G, and B color values for each of a plurality of pixels.

Figure 14:
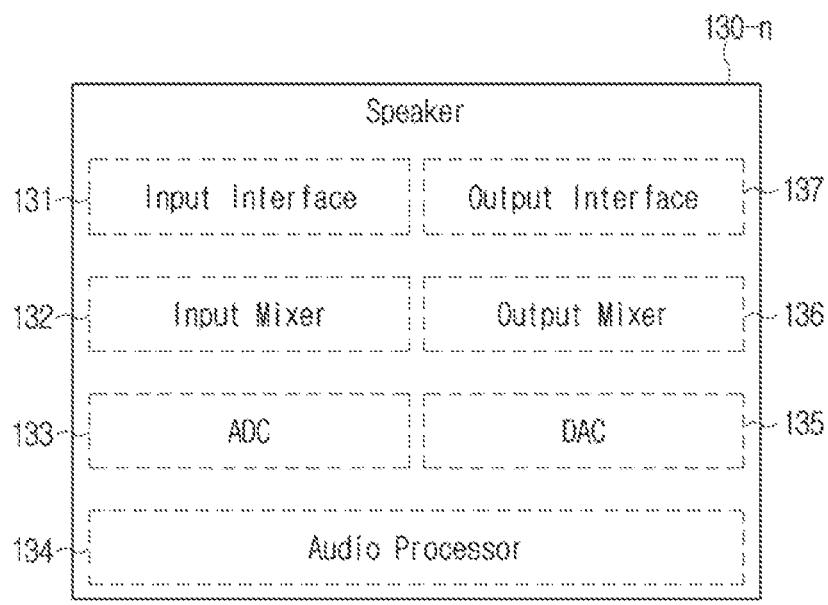
FIG. 14 is a block diagram showing components of a speaker according to an embodiment.

FIG. 14 is a block diagram showing additional components of a speaker according to an embodiment.

The plurality of speakers 130 may include a first speaker 130-1, a second speaker 130-2, . . . , an n-th speaker 130-*n*. Hereinafter, the n-th speaker 130-*n* will be described as a representative of other speakers in order to omit overlapping content. That is, the description of the n-th speaker 130-*n* may be applied to other speakers in the same way.

Referring to FIG. 14, the n-th speaker 130-*n* according to an embodiment of the disclosure may include an input interface 131, an input mixer 132, an analog to digital converter 133, an audio processor 134, and a digital to analog converter 135, an output mixer 136, and an output interface 137.

The input interface 131 may receive a plurality of audio signals corresponding to a plurality of audio channels. For example, the input interface 131 may receive the audio signal from the input device 150 such as a microphone or an external device connected by wired or wireless communication, or may receive the audio signal from other components (e.g., the processor 140, the memory 160, etc.) of the display device 100.

The input mixer 132 may synthesize the plurality of input audio signals into at least one audio signal. For example, the input mixer 132 may also synthesize a plurality of analog audio signals input through the input interface 131 into at least one analog audio signal.

The analog to digital converter (ADC) 133 may convert an analog audio signal into a digital audio signal. For example, the analog to digital converter 133 may convert the analog audio signal received through the input interface 131 or the analog audio signal synthesized through the input mixer 132 into the digital audio signal.

The audio processor 134 may perform various processing for the digital audio signal received through the analog to digital converter 133 or the digital audio signal received from other components (e.g., the processor 140, the memory 160, etc.) of the display device 100. As an example, the audio processor 134 may change a sampling rate, apply at least one filter, perform interpolation processing, amplify or attenuate all or part of a frequency bandwidth, perform noise processing (e.g., attenuation of noise or echo), change the audio channel (e.g., switching between mono and stereo), perform mixing on the plurality of audio channels, or extract specific signals from one or more digital audio signals. In addition, one or more functions of the audio processor 134 may be implemented in the form of an equalizer. However, this is only an example, and the operation performed by the audio processor 134 may be performed by the processor 140 according to the disclosure, or shared and performed.

The digital to analog converter (DAC) 135 may convert the digital audio signal into the analog audio signal. For example, the digital to analog converter 135 may convert the digital audio signal processed by the audio processor 134 or the digital audio signal received from other components (e.g., the processor 140 or the memory 160) of the display device 100 into the analog audio signal.

The output mixer 136 may synthesize a plurality of audio signals to be output into at least one audio signal. For example, the output mixer 136 may synthesize the audio signal (e.g., the analog audio signal received through the input interface 131) different from the analog audio signal converted by the digital to analog converter 135 into at least one analog audio signal.

The output interface 137 may output the analog audio signal converted by the digital to analog converter 135 or the analog audio signal synthesized by the output mixer 136 to the outside of the display device 100. For example, the output interface 137 may be implemented as a dynamic driver, a balanced armature driver, or the like.

FIG. 15 is a flowchart showing a control method of a display device according to an embodiment.

Referring to FIG. 15, a non-limiting embodiment of control method of a display device 100 may include an operation (S1510) of outputting a plurality of audio signals corresponding to a plurality of audio channels through a plurality of speakers 130, an operation (S1520) of controlling a motor 110 to rotate a display 120 based on an input of a user command for rotating the display 120, and an operation (S1530) of controlling the plurality of speakers 130 to output the plurality of audio signals based on positions of the plurality of speakers 130 changed according to the rotation of the display 120.

In operation S1510, a plurality of audio signals corresponding to a plurality of audio channels may be output through a plurality of speakers 130.

The plurality of speakers 130 may be provided in a plurality of regions and positioned in a plurality of different directions in relation to a rotating shaft 10 of the display 120.

To output the plurality of audio signals, the audio channel corresponding to the position of each of the plurality of speakers 130 may be identified, and the audio signal corresponding to the identified audio channel may be output through each speaker.

When outputting the plurality of audio signals, a first audio signal corresponding to a first audio channel among the plurality of audio channels may be output through a first speaker 130-1 of the plurality of speakers 130, and a second audio signal corresponding to a second audio channel among the plurality of audio channels may be output through a second speaker 130-2 of the plurality of speakers 130. In operation S1520, when a user command for rotating the display 120 is input, the motor 110 may be controlled to rotate the display 120.

In operation S1530, after the rotation of the display 120, the plurality of speakers 130 may be controlled to output the plurality of audio signals based on the positions of the plurality of speakers 130 that have been changed by rotating the display 120.

When position of each of the plurality of speakers 130 is changed according to the rotation of the display 120, the audio channel corresponding to the new position of each speaker may be identified, and the audio signal corresponding to the identified audio channel may be output through each speaker.

When the display 120 is rotated by 90°, the first speaker 130-1 may be a speaker positioned in the same direction as a direction in which the second speaker 130-2 was position prior to the rotation. Accordingly, the first speaker 130-1 may be controlled to output the second audio signal. According to an embodiment, controlling of the speakers 130 may include identifying a ratio at which the first and second audio signals are mixed based on a rotation angle at which the display 120 is rotated, and controlling the first speaker 130-1 to output the audio signal mixed based on the identified ratio through the first speaker 130-1 while the display 120 is rotated.

The control method may further include controlling the display 120 to rotate and controlling an image displayed on the display 120 to rotate in a direction opposite to the direction in which the display 120 is rotated while the display 120 is rotated based on the rotation angle of the display 120.

According to an embodiment, the plurality of speakers 130 may be controlled to output an audio signal in which the plurality of audio signals are synthesized while the display 120 is rotated.

According to an embodiment, when it is identified that the display 120 is rotated by a predetermined critical angle smaller than 90°, the second audio signal may be output through the first speaker 130-1 among the plurality of speakers 130, and when the display 120 is rotated by 90°, the first speaker 130-1 may be positioned in the same direction as the direction in which the second speaker 130-2 was positioned relative to the rotating shaft 10 before the display 120 was rotated.

Here, the control method may further include controlling the display 120 to rotate by 90° and control an image displayed on the display 120 to rotate in a direction opposite to the direction in which the display 120 is rotated, when it is identified that the display 120 is rotated by the predetermined critical angle.

The plurality of speakers 130 may include a plurality of speakers provided in each of a plurality of regions on the display 120.

In the outputting of the plurality of audio signals, a first audio signal corresponding to the first audio channel may be output through a plurality of first speakers 130-1A and 130-1B provided in a first region of the plurality of regions, and a second audio signal corresponding to the second audio channel may be output through a plurality of second speakers 130-2A and 130-2B provided in a second region of the plurality of regions.

In some non-limiting embodiments, when the display 120 is rotated by 90°, the second audio signal may be output through the plurality of first speakers 130-1A and 130-1B. At this time, when the display 120 is rotated by 90°, the first region may be a region positioned in the same direction as a direction in which the second region was positioned relative to the rotating shaft 10 before the display 120 was rotated.

While the display 120 is rotated according to the user command, the second audio signal may be output through the speaker 130-1B which is adjacent to a second region, and the first audio signal may be output through the remaining speaker 130-1A.

According to diverse embodiments of the disclosure, a display device in which an audio signal output according to rotation of a display and a control method thereof are provided.

According to diverse embodiments of the disclosure, a user may be provided with a more smooth and natural transition of image and audio while the display rotates.

The diverse embodiments of the disclosure may be implemented by software including instructions that are stored in machine-readable storage media (e.g., a computer). The machine may be an apparatus that invokes the stored instructions from the storage media and is operable according to the invoked instructions, and may include the electronic apparatus (e.g., an electronic device) according to the embodiments of the disclosure. When the instructions are executed by the processor 140, the processor 140 may perform functions corresponding to the instructions, either directly or using other components under the control of the processor 140. The instructions may include codes generated or executed by a compiler or an interpreter. The machine-readable storage media may be provided in the form of non-transitory storage media. Here, the term 'non-transitory' means that the storage medium does not include a signal and is tangible, but does not distinguish whether data is stored semi-permanently or temporarily in the storage medium.

The method according to diverse embodiments may be provided in a computer program product. The computer program product may be traded as a product between a seller and a purchaser. The computer program product may be distributed in the form of a machine readable storage media (e.g., a compact disc read only memory (CD-ROM)), or online through an application store (e.g., PlayStore™). In the case of the online distribution, at least a portion of the computer program product may be at least temporarily stored in a storage medium such as a memory of a server of a manufacturer, a server of an application store, or a relay server, or be temporarily generated.

Each of the components (e.g., modules or programs) according to the diverse embodiments may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration. The operations performed by the module, the program, or other component, in accordance with the diverse embodiments may be executed in a sequential, parallel, iterative, or heuristic manner, or at least some operations may be executed in a different order or omitted, or other operations may be added.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope of the disclosure.

What is claimed is:

1. A display device comprising:
   a motor;
   a display;
   a plurality of speakers comprising a first speaker and a second speaker; and
   at least one processor configured to:
   control the first speaker to output a first audio signal,
   based on a user command for rotating the display being received, control the motor to rotate the display,
   control the first speaker to output the first audio signal with a first volume and the second speaker to output the first audio signal with a second volume while the display is being rotated, and
after the display is rotated, control the second speaker to output the first audio signal,
wherein the at least one processor is configured to, while the display is being rotated:
identify an angle at which the display is rotated, wherein the angle changes while the display is being rotated,
based on the identified angle, rotate an image displayed on the display in a first direction while the display is being rotated,
identify a ratio between the first volume of the first audio signal outputted through the first speaker and the second volume of the first audio signal outputted through the second speaker based on the identified angle, wherein the ratio changes according to the angle, and
based on the identified ratio, control the first speaker to decrease the first volume of the first audio signal outputted through the first speaker and the second speaker to increase the second volume of the first audio signal outputted through the second speaker, and
wherein the first direction is opposite to a second direction in which the display is rotated.

2. The display device as claimed in claim 1, wherein the plurality of speakers further comprises a third speaker and a fourth speaker, and
wherein the at least one processor is configured to:
control the third speaker to output a second audio signal,
while the display is being rotated, identify a ratio between a third volume of the second audio signal outputted through the third speaker and a fourth volume of the second audio signal outputted through the fourth speaker based on the identified angle and control the third speaker to output the second audio signal with the third volume and the fourth speaker to output the second audio signal with the fourth volume based on the identified ratio between the third volume and the fourth volume, and
after the display is rotated, control the fourth speaker to output the second audio signal, and
wherein, while the display is being rotated, the third volume of the second audio signal outputted through the third speaker decreases based on the identified ratio between the third volume and the fourth volume, and the fourth volume of the second audio signal outputted through the fourth speaker increases based on the identified ratio between the third volume and the fourth volume.

3. The display device as claimed in claim 2, wherein the first audio signal is L(left) audio signal or R(right) audio signal, and if the first audio signal is the L audio signal, the second audio signal is the R audio signal and if the first audio signal is the R audio signal, the second audio signal is the L audio signal.

4. The display device as claimed in claim 2 wherein, the display is configured to rotate 90 degrees in a clockwise direction or a counterclockwise direction,
wherein a position of the second speaker in the display after the display is rotated corresponds to a position of the first speaker in the display before the display is rotated, and
wherein a position of the fourth speaker in the display after the display is rotated corresponds to a position of the third speaker in the display before the display is rotated.

5. The display device as claimed in claim 4, wherein if the first speaker is a speaker which is positioned in a left side of the display, the third speaker is a speaker which is positioned in a right side of the display and the display rotates 90 degrees in the clockwise direction, the second speaker is a speaker which is positioned in a bottom side of the display and the fourth speaker is a speaker which is positioned in a upper side of the display,
if the first speaker is the speaker which is positioned in the left side of the display, the third speaker is the speaker which is positioned in the right side of the display and the display rotates 90 degrees in the counterclockwise direction, the second speaker is the speaker which is positioned in the upper side of the display and the fourth speaker is a speaker which is positioned in the bottom side of the display,
if the first speaker is the speaker which is positioned in the right side of the display, the third speaker is the speaker which is positioned in the left side of the display and the display rotates 90 degrees in the clockwise direction, the second speaker is the speaker which is positioned in the upper side of the display, and the fourth speaker is the speaker which is positioned in the bottom side of the display, and
if the first speaker is the speaker which is positioned in the right side of the display, the third speaker is the speaker which is positioned in the left side of the display and the display rotates 90 degrees in the counterclockwise direction, the second speaker is the speaker which is positioned in the bottom side of the display and the fourth speaker is the speaker which is positioned in the upper side of the display.

6. The display device as claimed in claim 1, wherein if the identified angle is less than 45 degrees, the first volume of the first audio signal outputted through the first speaker is greater than the second volume of the first audio signal outputted through the second speaker, and if the identified angle is greater than 45 degrees, the first volume of the first audio signal outputted through the first speaker is less than the second volume of the first audio signal outputted through the second speaker.

7. The display device as claimed in claim 1, wherein if the identified angle is 30 degrees, the first volume of the first audio signal outputted through the first speaker is ⅔ of a volume of the first audio signal outputted through the first speaker before the display is rotated and the second volume of the first audio signal outputted through the second speaker is ⅓ of the volume of the first audio signal outputted through the first speaker before the display is rotated.

8. The display device as claimed in claim 2, wherein if the identified angle is less than 45 degrees, the third volume of the second audio signal outputted through the third speaker is greater than the fourth volume of the second audio signal outputted through the fourth speaker, and if the identified angle is greater than 45 degrees, the third volume of the second audio signal outputted through the second speaker is less than the fourth volume of the second audio signal outputted through the fourth speaker.

9. A control method of a display device, the control method comprising:
outputting, through a first speaker of the display device, a first audio signal;
based on a user command for rotating a display of the display device being received, rotating the display of the display device;
outputting, through the first speaker and a second speaker of the display device, the first audio signal with a first volume and the first audio signal with a second volume respectively while the display is being rotated; and after the display is rotated, outputting, through the second speaker, the first audio signal, wherein the outputting, through the first speaker and the second speaker, the first audio signal with the first volume and the first audio signal with the second volume respectively comprises:

identifying an angle at which the display is rotated, wherein the angle changes while the display is being rotated;

based on the identified angle, rotating an image displayed on the display in a first direction while the display is being rotated;

identifying a ratio between the first volume of the first audio signal outputted through the first speaker and the second volume of the first audio signal outputted through the second speaker based on the identified angle, wherein the ratio changes according to the angle; and decreasing the first volume of the first audio signal outputted through the first speaker and increasing the second volume of the first audio signal outputted through the second speaker, and wherein the first direction is opposite to a second direction in which the display is rotated.

10. The control method as claimed in claim 9, further comprising:

outputting, through a third speaker of the display device, a second audio signal;

while the display is being rotated, identifying a ratio between a third volume of the second audio signal outputted through the third speaker of the display device and a fourth volume of the second audio signal outputted through a fourth speaker of the display device based on the identified angle and outputting, through the third speaker and the fourth speaker, the second audio signal with the third volume and the second audio signal with the fourth volume respectively based on the identified ratio between the third volume and the fourth volume; and after the display is rotated, outputting, through the fourth speaker, the second audio signal, wherein, while the display is being rotated, the third volume of the second audio signal outputted through the third speaker decreases based on the identified ratio between the third volume and the fourth volume, and the fourth volume of the second audio signal outputted through the fourth speaker increases based on the identified ratio between the third volume and the fourth volume.

11. The control method as claimed in claim 10, wherein the first audio signal is L(left) audio signal or R(right) audio signal, and if the first audio signal is the L audio signal, the second audio signal is the R audio signal and if the first audio signal is the R audio signal, the second audio signal is the L audio signal.

12. The control method as claimed in claim 10 wherein, the display is configured to rotate 90 degrees in a clockwise direction or a counterclockwise direction, wherein a position of the second speaker in the display after the display is rotated corresponds to a position of the first speaker in the display before the display is rotated, and wherein a position of the fourth speaker in the display after the display is rotated corresponds to a position of the third speaker in the display before the display is rotated.

13. The control method as claimed in claim 12, wherein if the first speaker is a speaker which is positioned in a left side of the display, the third speaker is a speaker which is positioned in a right side of the display and the display rotates 90 degrees in the clockwise direction, the second speaker is a speaker which is positioned in a bottom side of the display and the fourth speaker is a speaker which is positioned in a upper side of the display, if the first speaker is the speaker which is positioned in the left side of the display, the third speaker is the speaker which is positioned in the right side of the display and the display rotates 90 degrees in the counterclockwise direction, the second speaker is the speaker which is positioned in the upper side of the display and the fourth speaker is a speaker which is positioned in the bottom side of the display, if the first speaker is the speaker which is positioned in the right side of the display, the third speaker is the speaker which is positioned in the left side of the display and the display rotates 90 degrees in the clockwise direction, the second speaker is the speaker which is positioned in the upper side of the display, and the fourth speaker is the speaker which is positioned in the bottom side of the display, and if the first speaker is the speaker which is positioned in the right side of the display, the third speaker is the speaker which is positioned in the left side of the display and the display rotates 90 degrees in the counterclockwise direction, the second speaker is the speaker which is positioned in the bottom side of the display and the fourth speaker is the speaker which is positioned in the upper side of the display.

14. The control method as claimed in claim 9, wherein if the identified angle is less than 45 degrees, the first volume of the first audio signal outputted through the first speaker is greater than the second volume of the first audio signal outputted through the second speaker, and if the identified angle is greater than 45 degrees, the first volume of the first audio signal outputted through the first speaker is less than the second volume of the first audio signal outputted through the second speaker.

15. The control method as claimed in claim 9, wherein if the identified angle is 30 degrees, the first volume of the first audio signal outputted through the first speaker is ⅔ of a volume of the first audio signal outputted through the first speaker before the display is rotated and the second volume of the first audio signal outputted through the second speaker is ⅓ of the volume of the first audio signal outputted through the first speaker before the display is rotated.

16. The control method as claimed in claim 10, wherein if the identified angle is less than 45 degrees, the third volume of the second audio signal outputted through the third speaker is greater than the fourth volume of the second audio signal outputted through the fourth speaker, and if the identified angle is greater than 45 degrees, the third volume of the second audio signal outputted through the second speaker is less than the fourth volume of the second audio signal outputted through the fourth speaker.

* * * * *